US008622656B2

(12) United States Patent
Wegener et al.

(10) Patent No.: US 8,622,656 B2
(45) Date of Patent: Jan. 7, 2014

(54) APPARATUS, SYSTEMS AND METHODS FOR THE RELOCATION OF SUBSURFACE CONDUIT

(75) Inventors: Robert W. Wegener, McHenry, IL (US); John W. Jinnings, Leo, IN (US); Mark Tingley, Rockford, IL (US); David Zarembski, Rockford, IL (US)

(73) Assignee: Terra Technologies, LLC, McHenry, IL (US)

( * ) Notice: Subject to any disclaimer, the term of this patent is extended or adjusted under 35 U.S.C. 154(b) by 426 days.

(21) Appl. No.: 13/035,892

(22) Filed: Feb. 25, 2011

(65) Prior Publication Data
US 2011/0206463 A1    Aug. 25, 2011

Related U.S. Application Data

(60) Provisional application No. 61/308,179, filed on Feb. 25, 2010.

(51) Int. Cl.
*F16L 1/028* (2006.01)

(52) U.S. Cl.
USPC .................................................. 405/184.4

(58) Field of Classification Search
USPC .................. 405/184.4; 248/49, 55, 28, 59
See application file for complete search history.

(56) References Cited

U.S. PATENT DOCUMENTS

| 4,218,158 | A | * | 8/1980 | Tesson | 405/170 |
| 4,981,395 | A | * | 1/1991 | Datin et al. | 405/184.4 |
| 7,004,682 | B1 | * | 2/2006 | Moody | 405/184.4 |

FOREIGN PATENT DOCUMENTS

| JP | 07-026570 | 1/1995 |
| JP | 07-071653 | 3/1995 |
| JP | 08-121650 | 5/1996 |
| JP | 11-323887 | 11/1999 |

OTHER PUBLICATIONS

International Search Report and Written Opinion and Written Opinion of the International Searching Authority for PCT /US2011/ 026375.

* cited by examiner

*Primary Examiner* — Tara M. Pinnock
(74) *Attorney, Agent, or Firm* — Scherrer Patent & Trademark Law, P.C.; Stephen T. Scherrer

(57) ABSTRACT

Apparatuses, systems and methods are utilized to relocate subsurface conduit. Specifically, the movement of underground conduit is accomplished via the apparatuses, systems and methods described herein, including movement thereof in either or both of laterally from a first lateral position to a second lateral position and/or vertically from a first vertical position to a second vertical position.

24 Claims, 18 Drawing Sheets

APPARATUS, SYSTEMS AND METHODS FOR THE RELOCATION OF SUBSURFACE CONDUIT

The present invention claims priority to U.S. Provisional Patent Application No. 61/308,179, filed on Feb. 25, 2010, which is incorporated herein in its entirety.

TECHNICAL FIELD

The present invention relates to apparatus, systems and methods for the relocation of subsurface conduit. Specifically, the present disclosure relates to the movement of underground conduit, including, but not limited to, cables and pipes in either or both of laterally from a first lateral position to a second lateral position and/or vertically from a first vertical position to a second vertical position.

BACKGROUND

It is, of course, generally known to bury cables, pipes and conduits underground for the transport of electricity, material and/or information. In many cases, cables, pipes and conduits are disposed underground beneath or in the vicinity and running parallel to roadways. Particularly in urban environments, when it is necessary to expand or relocate the path of a roadway, construction crews will often be required to relocate underground structures to avoid rending such structures inaccessible. For example, electrical, telephone and/or fiber optic cables are frequently buried encased in a conduit structure, such as clay tile or a raceway unitary subterranean support structure for the cables, individual raceway sections are placed end to end and mortared together. These conduit structures are frequently buried near the side of a roadway and follow along the path of the roadway. When the roadway is widened, the cables routed through the conduit structure typically must be moved to avoid buying cables beneath the expanded roadway surface.

Currently, to move cables routed through a conduit structure, the conduit structure is exposed and destroyed. The cables are then removed from the conduit and bundled. The cable bundles are suspended from ropes or ties as the new location for the cables is excavated. A replacement conduit, such as a two-piece replacement conduit made of a polymer such as polyvinyl chloride (PVC), may be used to house the cables in the new location. The cable bundle is placed into the first conduit piece, and the second conduit piece is attached thereto to form a closed conduit. Such as two-piece PVC replacement conduit each has flanges that abut one another when the pieces are assembled, and the flanges are then secured together by fasteners or tie wraps. Alternatively, the replacement conduit may be a plywood form into which the suspended cables are lowered after the form is placed in the excavated area at the new cable location. After placement in the new location, concrete is poured over the replacement conduit, thereby cementing the cable bundles in their new location.

While this process is effective, it is time consuming and expensive. Further, the cable bundles may become kinked or damaged from the ropes or ties used to suspend the cables after removal from the original conduit. Further, the original conduit may contain hazardous materials, such as asbestos, potentially adding to the cost and complexity of the traditional cable relocation method.

Similar problems are present when underground piping, such as natural gas and petroleum lines, must be moved to accommodate the widening of a roadway.

A need, therefore, exists for apparatus, systems and methods for relocating subsurface conduit. Specifically, a need exists for apparatus, systems and methods for relocating subsurface conduit without destroying the subsurface conduit.

Further, a need exists for apparatus, systems and methods for relocating subsurface conduit without substantially interrupting the flow of material, electricity and/or information through the conduit. Moreover, a need exists for apparatus, systems and methods for relocating subsurface conduit efficiently and expeditiously.

Still further, a need exists for apparatus, systems and methods for relocating subsurface conduit in the event a roadway must be widened. Thus, a need exists for apparatus, systems and methods for relocating subsurface conduit laterally so as to be placed in a proper location as a roadway is widened. Moreover, a need exists for apparatus, systems and methods for relocating subsurface conduit to a different depth in the event that a conduit must be moved up or down in relation to the surface. In addition, a need exists for apparatus, systems and methods for relocating subsurface conduit in both laterally and in depth.

A need further exists for apparatus, systems and methods for relocating subsurface conduit to follow a roadway in parallel either beneath the roadway or in the general vicinity of the roadway. Moreover, a need exists for apparatus, systems and methods for relocating subsurface conduit to follow a curved path; such as if the roadway is curved or otherwise has turns.

SUMMARY OF THE INVENTION

The present disclosure provides apparatus, systems and methods that facilitate movement of underground (subsurface) conduit, without disturbing the integrity of the original conduit. In an embodiment, the area around the conduit is first excavated, exposing one side of the conduit and leaving a buffer of subterranean material on the remaining sides. Sheets of metal pile are driven into the subterranean material underneath the conduit to create an elongated support surface for the conduit and subterranean material buffer. The sheets of metal pile are coupled to a translation system so that the metal pile, subterranean material buffer, and conduit are simultaneously relocated to a new position.

Once in the new position, the translation system is decoupled from the sheet pile. The sheet pile may optionally be removed from underneath the subterranean material and conduit. The excavated area is filled in around the conduit to complete the process. Advantageously, long sections of conduit may be moved as a single section using the translation system while keeping the conduit intact and structurally sound, thereby obviating the need to replace or rebuild conduit.

In an embodiment, the present invention provides a conduit transport system for transferring a conduit from a first lateral position to a second lateral position, or a first vertical position to a second vertical position, or both a first lateral position to a second lateral position and a first vertical position to a second vertical position. The system may include a plurality of lateral supports sized to extend from the first to the second lateral position, a plurality of trolley assemblies adapted to translated along the plurality of lateral supports, a plurality of lift mechanisms (each individually associated with a trolley assembly and adapted to either simultaneously or consecutively translate at least one longitudinal support from the first vertical position to the second vertical position), at least one longitudinal conduit support coupled to each linear actuator, with each linear actuator coupled to a respective one of the trolley assemblies, in which the linear actuators are operable to translate the plurality of trolley assemblies.

In an embodiment, the present invention provides the capability to move the system and the collective components thereof, longitudinally along the conduit structure to reposition the system in another location along the conduit structure. Further, the present invention provides the capability to steer the system, or portions thereof, such as the plurality of lateral supports, trolley assemblies, lift actuators, linear actuators and/or longitudinal conduit supports laterally towards or away from the conduit structure when repositioning the same along the conduit structure.

In an embodiment, the present invention provides a method of moving conduit laterally, in which the method includes: excavating an area around the conduit; placing a plurality of lateral supports across the excavated area; placing at least one longitudinal conduit support upon the plurality of lateral supports so that the longitudinal conduit is positioned over the conduit; driving a plurality of plates underneath the conduit and longitudinal conduit; coupling the plurality of plates to the longitudinal conduit so that the conduit is vertically supported by the plates; and sliding the longitudinal conduit laterally across the plurality of lateral supports.

In an embodiment, the present invention provides a method of moving conduit up or down relative to a ground surface, the method comprises: excavating an area around the conduit; placing a plurality of lateral supports across the excavated area; placing at least one longitudinal conduit support upon the plurality of lateral supports so that the longitudinal conduit is positioned over the conduit; driving a plurality of plates underneath the conduit and longitudinal conduit; coupling the plurality of plates to the longitudinal conduit so that the conduit is vertically supported by the plates; and moving the longitudinal conduit up or down relative to the ground surface.

In an embodiment, the present invention provides a method for transferring a conduit from a first lateral position to a second lateral position and up or down relative to a ground surface, the method comprises: excavating an area around the conduit; placing a plurality of lateral supports across the excavated area; placing at least one longitudinal conduit support upon the plurality of lateral supports so that the longitudinal conduit is positioned over the conduit; driving a plurality of plates underneath the conduit and longitudinal conduit; coupling the plurality of plates to the longitudinal conduit so that the conduit is vertically supported by the plates; moving the longitudinal conduit laterally; and moving the longitudinal conduit up or down relative to the ground surface.

It is, therefore, an advantage of the present invention to provide apparatus, systems and methods for relocating subsurface conduit. Specifically, it is an advantage of the present invention to provide apparatus, systems and methods for relocating subsurface conduit without destroying the subsurface conduit.

Further, it is an advantage of the present invention to provide apparatus, systems and methods for relocating subsurface conduit without substantially interrupting the flow of material, electricity and/or information through the conduit. Moreover, it is an advantage of the present invention to provide apparatus, systems and methods for relocating subsurface conduit efficiently and expeditiously.

Still further, it is an advantage of the present invention to provide apparatus, systems and methods for relocating subsurface conduit in the event a roadway must be widened. Thus, it is an advantage of the present invention to provide apparatus, systems and methods for relocating subsurface conduit laterally so as to be placed in a proper location as a roadway is widened.

Moreover, it is an advantage of the present invention to provide a need apparatus, systems and methods for relocating subsurface conduit to a different depth in the event that a conduit must be moved up or down in relation to the surface. In addition, it is an advantage of the present invention to provide apparatus, systems and methods for relocating subsurface conduit in both laterally and in depth.

It is a further advantage of the present invention to provide apparatus, systems and methods for relocating subsurface conduit to follow a roadway in parallel either beneath the roadway or in the general vicinity of the roadway. Moreover, it is an advantage of the present invention to provide apparatus, systems and methods for relocating subsurface conduit to follow a curved path, such as if the roadway is curved or otherwise has turns.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

As indicated above, the present disclosure provides a method and apparatus which allows the lateral and/or up and down translation of conduit together with a buffer of subterranean material within which the conduit is buried. More particularly, the present disclosure provides a system in which the conduit is supported and protected from underneath by a support surface, and the support surface is suspended from a frame capable of lifting the conduit, lowering the conduit, and/or translating the conduit laterally as a single unit. Thus the structural integrity of the conduit is preserved, even if the conduit material is brittle or delicate.

As shown in the figures, conduits C, C' and C" are depicted as being raceways, each of which may have a plurality of openings extending along its longitudinal axis for the receipt of wires, cables, or other types of conduit therethrough. However, while shown herein as a raceway, conduits C, C' and C" may each be any type of conduit, such as a gas line, an oil line, an individual wire or bundle of wires, a fiber optic line or bundle of fiber optic lines, a sewer line, a fuel line, an electric line, an aqueduct, a phone line, and/or any other type of known conduit or a combination thereof.

Figure 1:
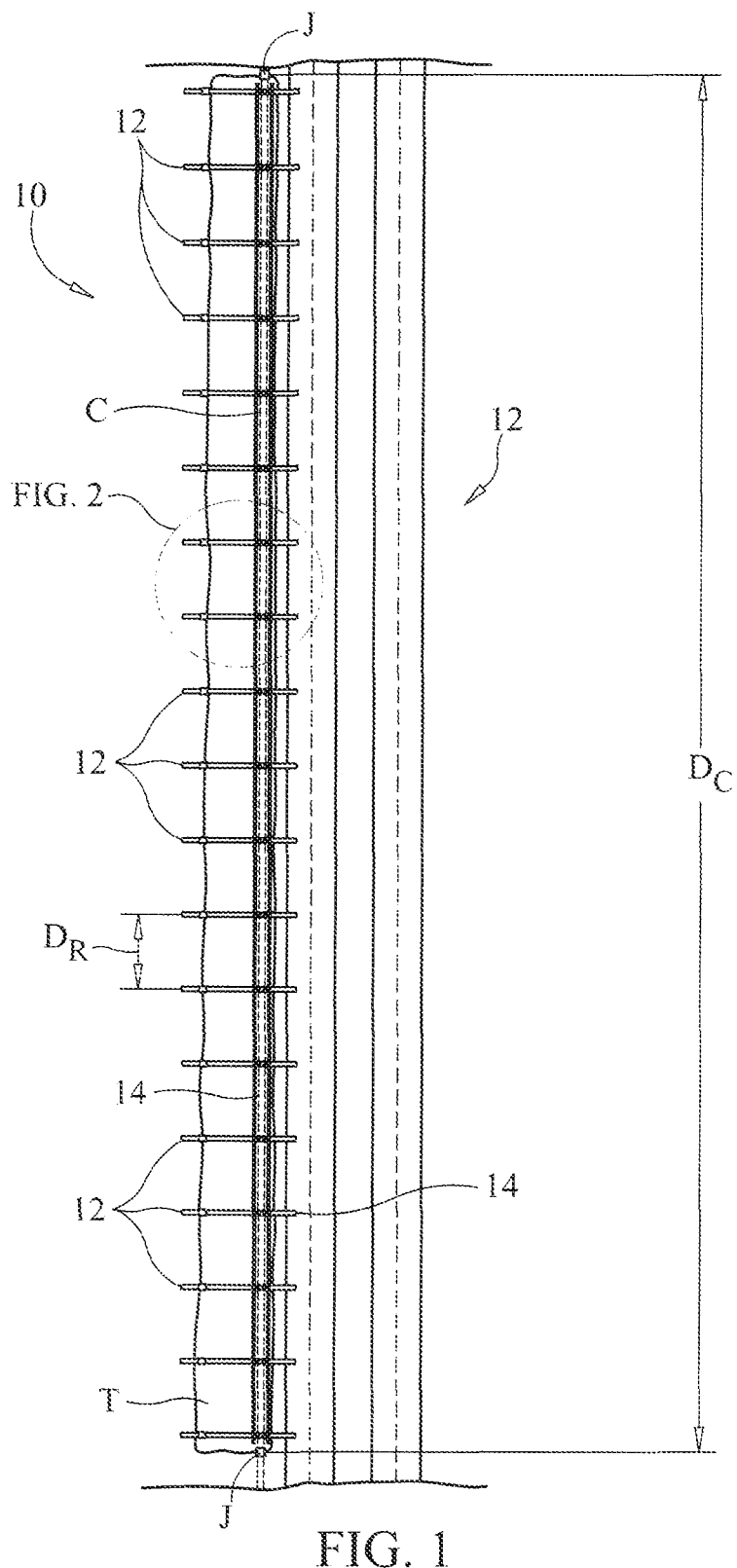
FIG. 1 illustrates a top plan view of a conduit relocation system in accordance with the present disclosure, illustrated adjacent a roadway.

Referring now to FIG. 1, a conduit relocation system 10 may include a plurality of translation rails 12 of sufficient length to span an excavated trench T having conduit C located therein. A pair of conduit support beams 14 may be disposed atop translation rails 12 by means of trolleys 16 (FIG. 5) and above conduit C, so that conduit support beams 14 may be used to lift, lower and/or support conduit C as conduit support beams 14 translate along translation rails 12, as described in further detail below. Conduit support beams 14 extend across a distance Dc, which is the distance between junction points J disposed at each end of conduit C.

In one exemplary embodiment, illustrated in the Figures, Dc may be about 500 to about 1000 feet in length, such as about 750 feet in length. Generally, Dc is a distance determined by the original installers of conduit C between junction points J. For example, any number of translation rails 12 may be placed along the width of trench T to support conduit C along the extent of support beams 14. In the illustrated embodiment of FIG. 1, translation rails 12 are separated by distance $D_R$, which is calculated to provide adequate support for the weight of beams 14, curved sheet pile 18, conduit C and any surrounding subterranean material, as discussed in detail below.

In this illustrated embodiment, distance DR between respective pairs of translation rails 12 is about 40 feet, which is an appropriate distance for an exemplary conduit C used for underground routing of telecommunication cables. In this exemplary embodiment, conduit C is made of a clay material and has a square cross-sectional shaped with cross-sectional dimensions of about 13 inches by 13 inches. Conduit C may be buried beside roadway R (FIG. 1), for example, such that conduit C is translatable by conduit relocation system 10 in order to provide additional space to widen roadway R.

However, it is within the scope of the present disclosure that conduit relocation system 10 may be adapted to a variety of uses and scales, in which the relative sizes and weights of translation rails 12, conduit support beams 14 and conduit C (or other subterranean structure) may vary widely. In such alternative embodiments, distance $D_R$ between translation rails 12 will also vary widely, as will distance $D_C$ representing the length of the structure to be translated. To accommodate this variability of scale, distance $D_R$ may be expressed as a fraction of distance $D_C$. This fraction may be between about 1/12 and about 1/25, for example. Similarly, the number of translation rails 12 required to accommodate distance $D_C$ will also vary depending on the parameters of the system to be moved, and may be as few as two or three translation rails 12 or as many as several dozen of translation rails 12, for example.

Figure 2:
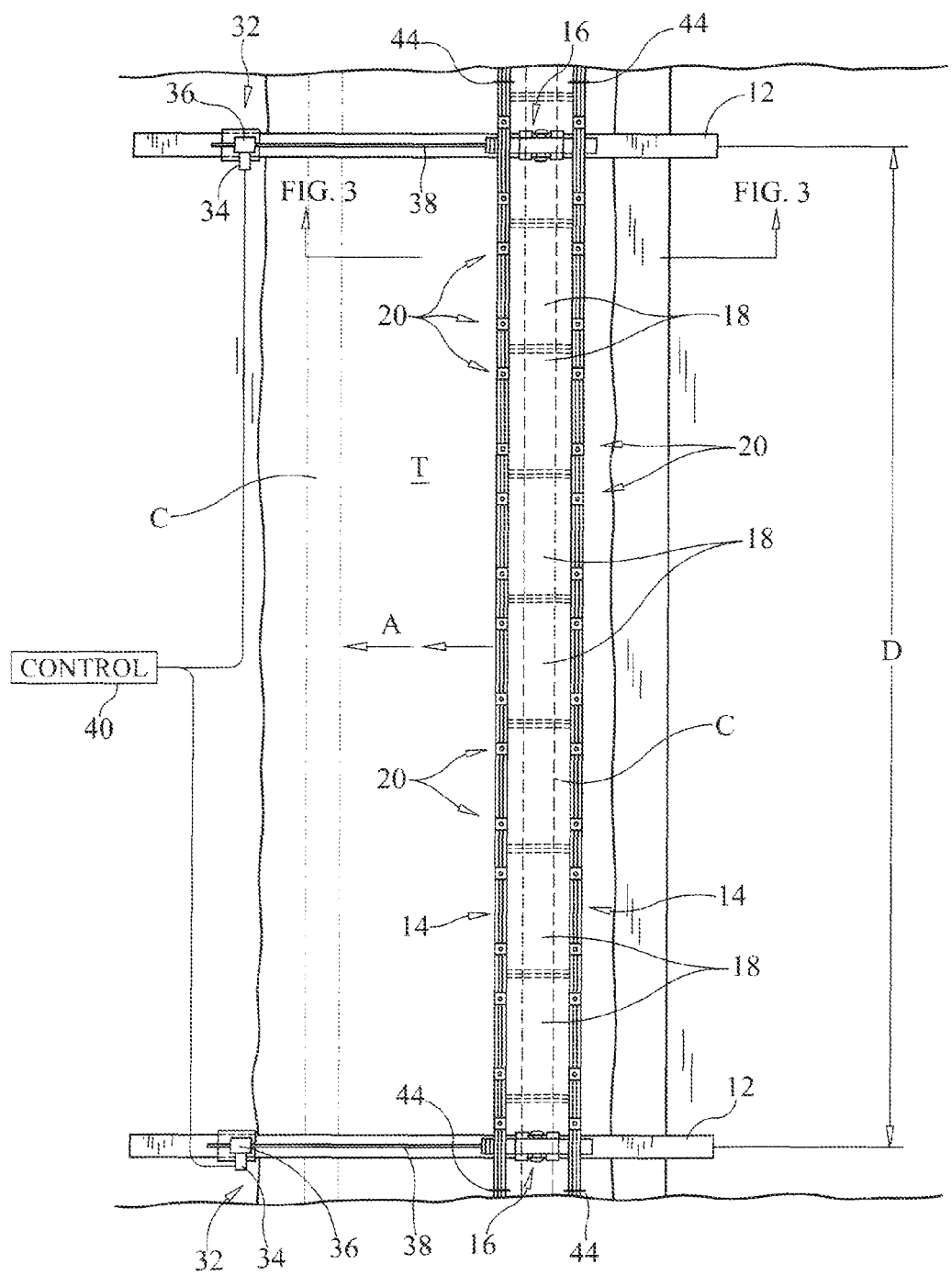
FIG. 2 illustrates an enlarged view of a portion of the conduit relocation system shown in FIG. 1.

Referring now to FIG. 2, a portion of conduit relocation system 10 is shown including a pair of neighboring translation rails 12 and a section of conduit support beams 14. Conduit C is disposed underneath and generally centered between conduit support beams 14 in an initial or original position within trench T. As will be described in detail below, support beams 14 and conduit C are translatable in the direction of arrow A within trench T to relocate conduit C to a second or relocated position.

To facilitate the translation of support beams 14 across translation rails 12, trolleys 16 are disposed between an upper surface of each translation rail 12 and lower surfaces of support beams 14. As discussed below, trolleys 16 provide a smooth rolling interface between conduit support beams 14 and respective translation rails 12, thereby minimizing the force required to translate conduit C within trench T. In the illustrated embodiment, translation rails 12 are vertically oriented I-beams, i.e., the web of the I-beam is vertically oriented while the flanges of the I-beam provide the lower support surface spanning trench T and the upper support surface for trolley 16.

Figure 3:
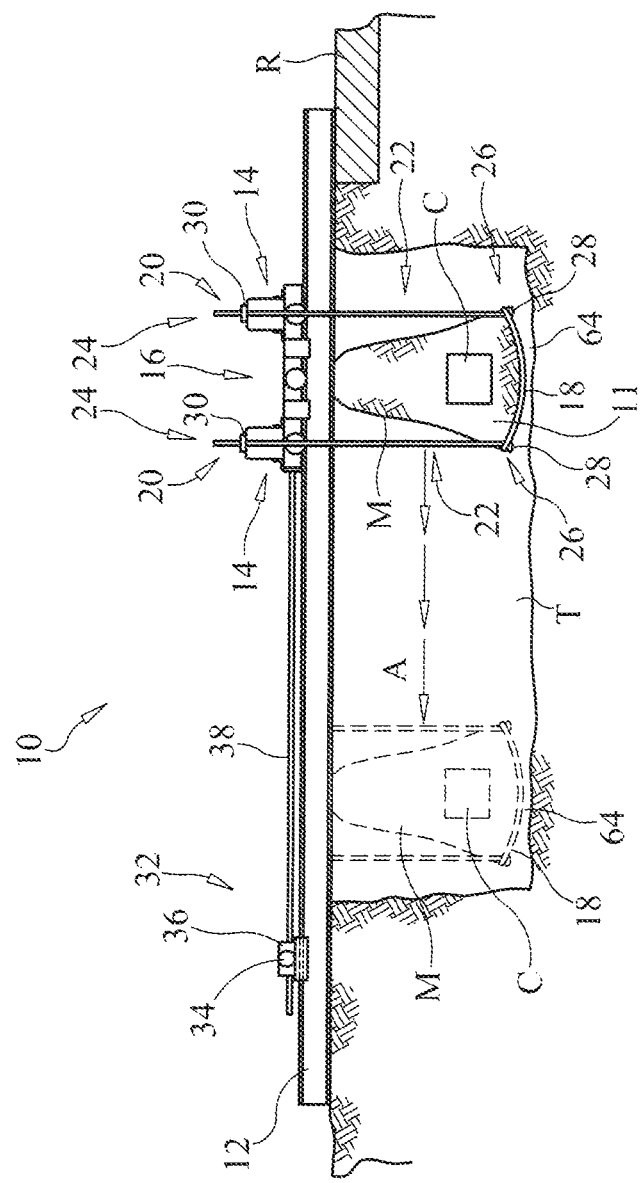
FIG. 3 illustrates an elevation view of the portion of the conduit relocation system shown in FIG. 2

Referring now to FIGS. 2 and 3, curved sheet pile 18 is disposed beneath conduit C and coupled to trolley 16 via support structure 20. Support structure 20 includes a suspension member or rod 22 having beam connection end 24 coupled to conduit support beam 14 and pile connection end 26 coupled to curved sheet pile 18. Specifically, beam connection end 24 of rod 22 is threaded to accept nut 30, so that rod 22 may be passed through a hole formed in support beam 14 and nut 30 may then be threaded onto beam connection end 24. Nut 30 cooperates with support beam 14 to prevent downward movement of support structure 20, as well as to facilitate upward movement of rod 22 via rotation of nut 30. Pile connection end 26 includes J-hook 29 adapted to pass through a slot (not shown) formed in curved sheet pile 18 in one rotational orientation and engage sheet pile 18 in another rotational orientation (as shown in FIG. 3), thereby coupling support structure 20 to sheet pile 18.

Exemplary curved sheet pile 18 and support structures 20 are disclosed in U.S. patent application Ser. No. 12/488,045 entitled METHODS FOR THE SUBTERRANEAN SUPPORT OF UNDERGROUND CONDUITS, filed Jun. 19, 2009, and U.S. patent application Ser. No. 12/500,906 entitled APPARATUS FOR INSERTING SHEET PILE HAVING AN INDEPENDENTLY ADJUSTABLE INSERTION ACCESS AND METHOD FOR USING THE SAME, filed Jul. 10, 2009, the entire disclosures of which are hereby incorporated herein by reference in their entireties.

Referring still to FIGS. 2 and 3, translation system 10 includes translation driver 32 to provide the requisite force for translating conduit support beams 14 along translation rails 12. Translation driver 32 includes motor 34 operatively coupled with a transmission 36 including a ball screw bearing or lead screw bearing, and a corresponding ball screw or lead screw 38 extending between transmission 36 and trolley 16. Lead screw 38 is fixedly coupled with trolley 16, as described in detail below, and is rotatably coupled in force transferring relationship with transmission 36. When motor 34 is activated, such as by control 40 (FIG. 2), transmission 36 rotates the screw bearing, causing linear translation of lead screw 38. The translation of lead screw 38 causes trolley 16 and support beams 14 to roll along translation rail 12, thereby translating conduit C within trench T.

As best seen in FIG. 2, each translation rail 12 may include a respective translation driver 32, and control 40 may be operatively coupled to each translation driver 32. As described in detail below, coupling a single control 40 to each of the multiple translation drivers 32 in translation system 10 may facilitate uniform movement of the entire span of conduit support beams 14 along all of translation rails 12, thereby uniformly distributing the force required to move conduit C across the span of conduit support beams 14. However, it is contemplated that other devices and methods may be used to provide the needed force for translation of support beams 14 and conduit C upon translation rails 12. For example, in one alternative embodiment, a cable and winch or set of cables and winches may be fixed to translation rails 12 and to any fixed structure, and actuated to pull trolleys 16. In another embodiment, a vehicle may be used to tow or push trolleys 16 along translation rails 12. Moreover, it is within the scope of the present disclosure that any suitable device or method may be used to apply force to support beams 14 to drive translation of support beams 14 and conduit C along translation rails 12.

Figure 4:
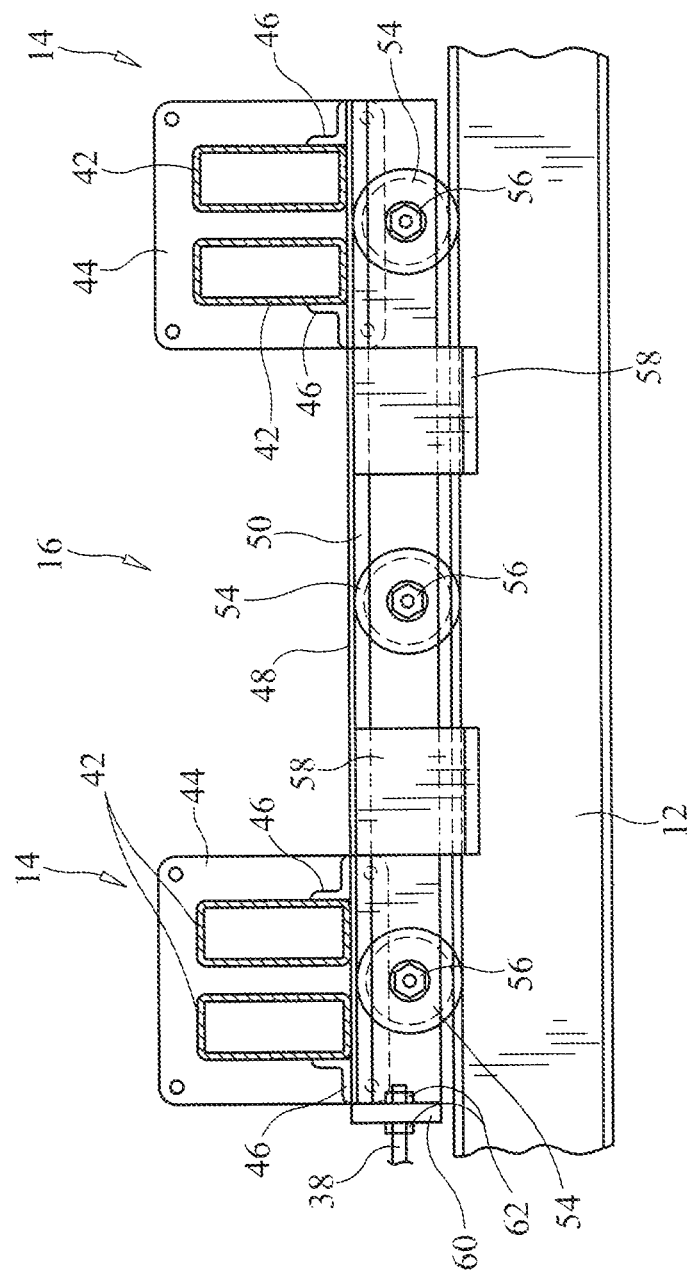
FIG. 4 illustrates a side elevation view of the trolley made in accordance with the present disclosure.
Figure 5:
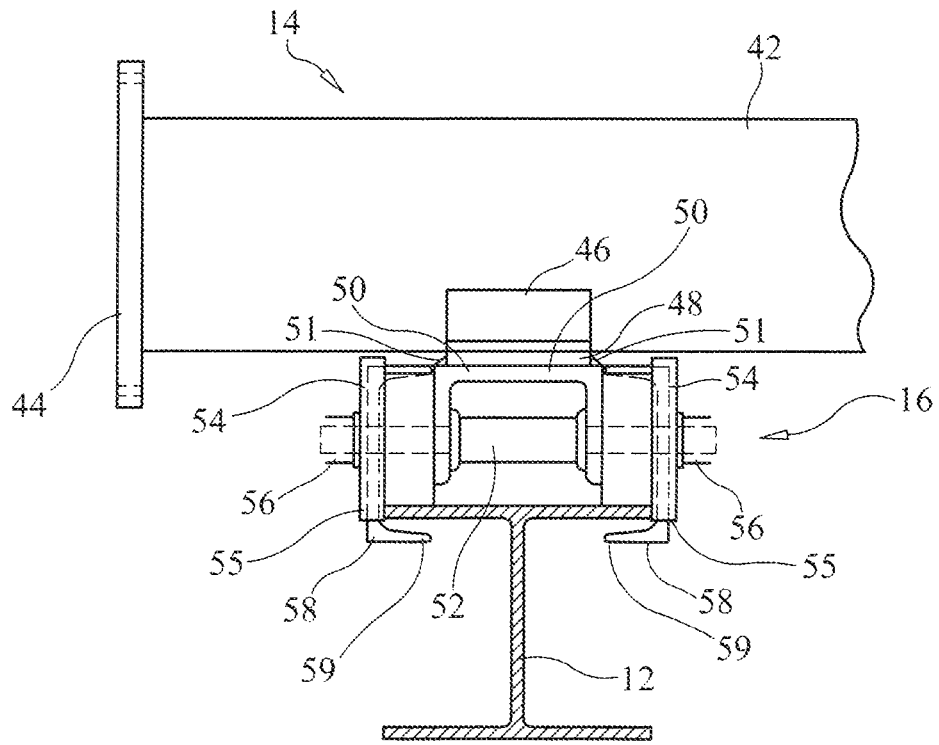
FIG. 5 illustrates an end elevation view of the trolley shown in FIG. 4
Figure 6:
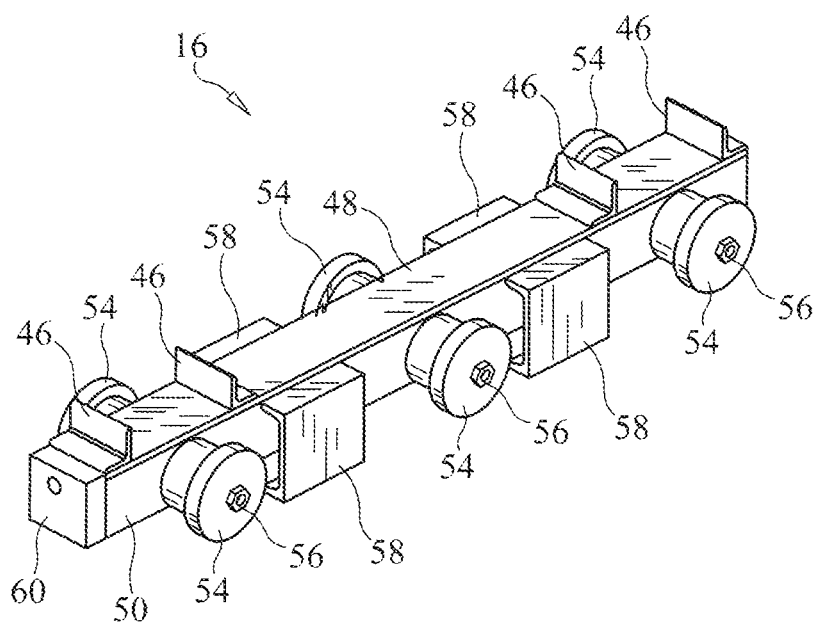
FIG. 6 illustrates a perspective view of the trolley shown in FIG. 4.
Figure 7:
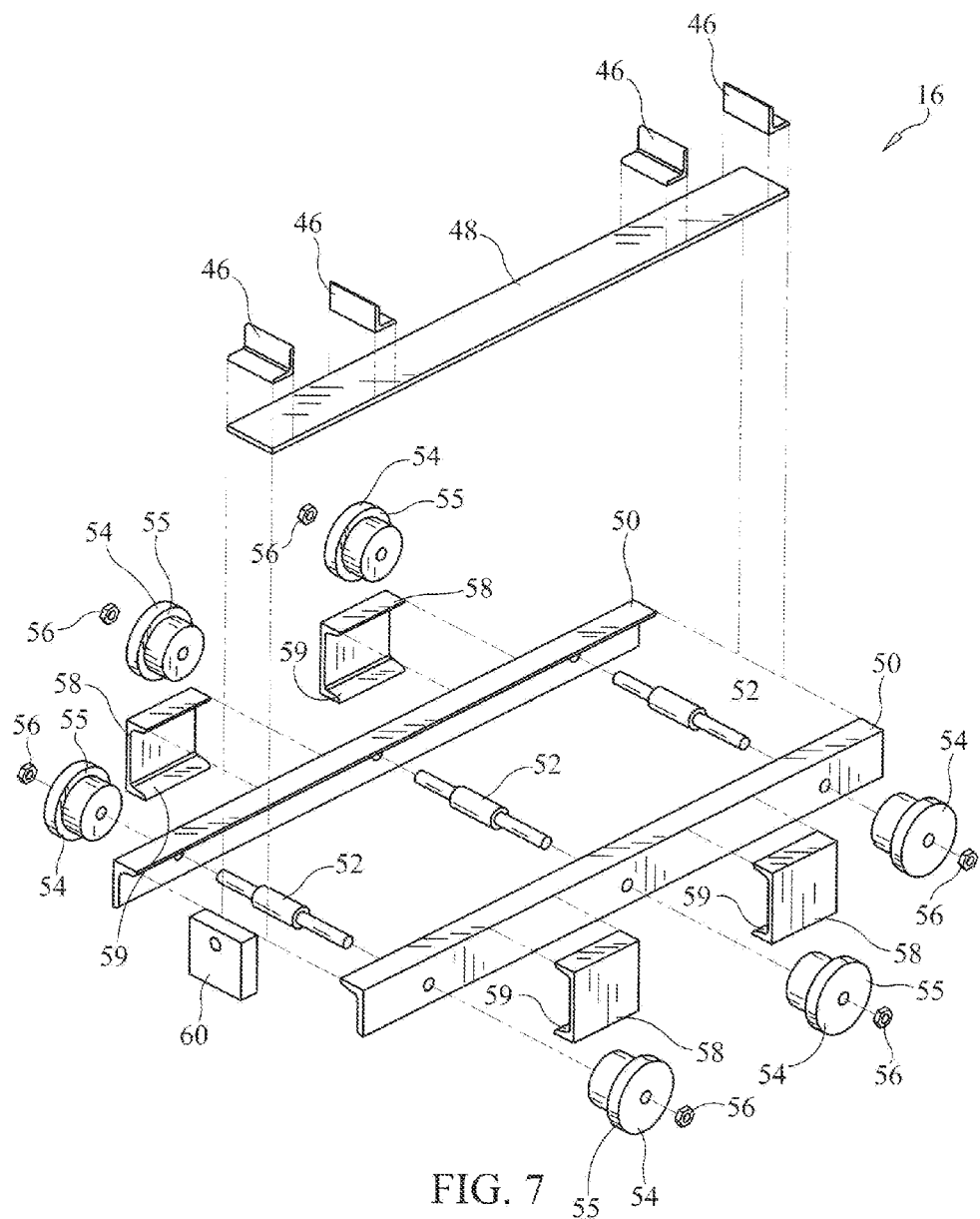
FIG. 7 illustrates an exploded perspective view of the trolley shown in FIG. 4.

Referring now to FIGS. 4 and 5, conduit support beams 14 each include a pair of tubes 42 situated side-by-side (FIG. 4) and joined by end plates 44 at each end of tubes 432, such as by welding. Tubes 42 may have a length such that they are transportable through standard transportation channels, such as by truck or train car. In one exemplary embodiment, tubes 42 may be approximately 40 feet long. Where conduit C is longer than tubes 42, end plates 44 may be joined to one another to create conduit support beam 14 in any length that is a multiple of the length of tubes 42.

As indicated above, trolley 16 is disposed between translation rail 12 and conduit support beams 14 (FIGS. 2 and 3). Trolley 16 is in rolling contact with translation rail 12, while conduit support beams 14 are coupled to trolleys 16. Referring generally to FIGS. 4-7, pairs of rail retention angles 46 may be affixed to rail support plate 48, and spaced to correspond with the outer width of support beams 14 so that the outer faces of tubes 42 of support beams 14 contact rail retention angles 46 to couple conduit support beams 14 to trolley 16 (FIG. 4). Rail support plate 48 is disposed upon and fixedly attached, i.e., by welding, to a pair of opposed trolley frame angles 50. Frame angles 50 are in turn fixedly attached to one another by weld bead 51 (FIG. 5) to form a channel-like shape. Captured between trolley frame angles 50 may be a plurality of axles 52, each of which may extend outwardly to receive flanged casters 54 at opposing ends of axle 52. In the illustrated embodiment, axles 52 are fixedly attached to trolley frame angles 50 and are therefore "dead shafts," i.e., they are not rotatable with respect to frame angles 50. To accommodate this "dead shaft" design, flanged casters 54 may have bearing (not shown) contained therein to facilitate rotation of casters 54 with respect to axles 52, even under heavy pressure. Casters 54 may be prevented from translating with respect to or falling off of axles 52 by retention axle nuts 56.

As best seen in FIG. 5, trolley 16 may include beam retention channels 58 fixedly attached, i.e., by welding, to each of trolley frame angles 50. As best seen in FIG. 5, beam retention channels 58 are sized and oriented so that lower lobes 59 of beam retention channels 58 may extend underneath the upper flange of translation rail 12 toward the web of the translation rail 12. Thus, beam retention channels 58 may operate to capture trolley 16 on translation rail 12, preventing trolley 16 from lifting vertically off of the upper flange of translation rail 12. In addition, the width between flanges 55 formed in flanged casters 54 may correspond with the width between the edges of the upper flange of translation rail 12. Thus, casters 54 may operate to center trolley 16 on translation rail 12 and may prevent side-to-side slipping of trolley 16 upon translation rail 12. Moreover, the cooperation of flanged casters 54 and beam retention channels 58 with translation rail 12 may ensure that trolley 16 is only moveable along the longitudinal extent of translation rail 12, thereby ensuring proper control over the motion of conduit support beams 14 and conduit C during translation within trench T, as discussed in more detail below.

Trolley 16 may further include screw coupler 60 (FIGS. 4, 6 and 7) positioned and oriented to facilitate the coupling of trolley 16 with translation driver 32. Specifically, screw coupler 60 may have a hole formed therethrough which is sized and located to receive lead screw 38 therethrough. As shown in FIG. 4, a pair of screw coupler nuts 62 may be threadably attached to lead screw 38 on either side of screw coupler 60 to fix lead screw 38 thereto. Screw coupler 60 may, in turn, be fixed to trolley 16, such as by welding screw coupler 60 to trolley frame angles 50 and/or rail support plate 48.

As discussed in more detail below, conduit C may be moved up or down, laterally, or a combination of up or down and laterally. In addition, conduit C may be moved in sections or continuously in a "wave" pattern. The nature of the movement of conduit C may depend on several factors, such as the composition or material of conduit C, the material conveyed by conduit C, the environment around conduit C, and other considerations.

Where conduit C may be brittle and/or inflexible, junction points J (FIG. 1) may be provided to facilitate the movement of conduit C. Conduit C may be disconnected from other adjacent sections at junction points J, thereby allowing conduit C to be moved with no significant bending or stress formation therein. Other conduits that may be disposed upstream and/or downstream of conduit C may subsequently be moved in a similar manner. Further, where conduit C conveys cable or electrical wire, junction points J may provide cable slack and/or a cable disconnect point to prevent stretching or stress in the cables themselves. However, an alternate relocation may be used where conduit C may have some flexibility, as described in more detail below.

Constituent pieces of conduit relocation system 10 may first be transported to a job site, such as a site beside roadway R, as illustrated in FIG. 1. To facilitate such transport, conduit support beam 14 may be broken down into multiple pieces joinable at end plates 44, as discussed above. Translation rails 12 may be bundled for transport. In addition, respective rails may or may not have trolleys 16 and/or translation drivers 32 already attached thereto, as described above.

Prior to installing conduit relocation system 10 proximate conduit C, trench T is excavated using any suitable method. A buffer zone or exclusion zone 11 of subterranean material M may be preserved around conduit C during the excavation, as illustrated in FIG. 3, so that the conduit C may be protected from impact and stress during the translation procedure. However aide or portion of conduit C may be exposed, at least temporarily, to determine the metes and bounds of the cross-sectional profile of conduit C within the subterranean material M. Exclusion zone 11 (FIG. 3) may extend around conduit C by a predetermined distance and may define an area that curved sheet piling 18 should not enter during insertion thereof. For example, an electronic control system may be used to facilitate the insertion of curved sheet piling 18 and may be programmed to stop the insertion of curved sheet piling 18 if the control system determines that continued movement of curved sheet piling 18 may result in curved sheet piling 18 entering exclusion zone 11.

With trench T and exclusion zone 11 established, curved sheet pile 18 may be installed beneath conduit C by driving sheet pile 18 into subterranean material M below conduit C. For example, curved sheet pile 18 may be attached to a pile driver assembly carried by a suitable construction machine, such as the vibratory pile driver system disclosed in U.S. Pat. No. 7,387,173, entitled PILE DRIVER, filed Mar. 7, 2006, U.S. patent application Ser. No. 12/041,133, entitled MODULAR VIBRATORY PILE DRIVER SYSTEM, filed Mar. 3, 2008, and U.S. Provisional Patent Application No. 61/169,807, entitled APPARATUS AND METHOD FOR FACILITATING THE SUBTERRANEAN SUPPORT OF UNDERGROUND CONDUITS HAVING A FIXED INSERTION AXIS, filed Apr. 16, 2009, the disclosures of which are hereby incorporated by reference herein in their entireties.

In an exemplary embodiment, sheet pile 18 may be driven into subterranean material M using vibratory pile drives, impact drives, hydraulic pile drivers, hydrostatic jacking mechanisms, or any other machine or mechanism apparent to one having ordinary skill in the art. Where a vibratory pile driver is used, the curved sheet piles 18 may be vibrated as they are inserted into subterranean material M. This vibration places the soil in suspension, which allows the piles to be directed through the soil along an arcuate path that may have a curvature substantially matching the radius of curvature of the curved sheet piles 18.

Sections of curved sheet pile 18 may be interlocked with one another to create a substantially continuous support surface underneath conduit C, so that subterranean material M and conduit C may be lifted or otherwise moved as one long continuous column of material. Methods and apparatuses of interlocking curved sheet piles 18 to one another include flanges that may be attached to one sheet pile 18 and supporting an adjacent sheet pile 18, flanges or structures may be adapted to interfit with one another to couple neighboring sheet piles 18, clamps coupling neighboring sheet piles 18, and the like. Exemplary methods and apparatuses for coupling curved sheet piles 18 are disclosed in U.S. Provisional Patent Application No. 61/169,807, entitled APPARATUS AND METHOD FOR FACILITATING THE SUBTERRANEAN SUPPORT OF UNDERGROUND CONDUITS HAVING A FIXED INSERTION AXIS, incorporated by reference above. However, it is within the scope of the present disclosure that any suitable support surface may be used to support conduit C and subterranean material M, such as flat plate materials, continuous plate materials, and the like.

With curved sheet piles 18 in place underneath conduit C, translation rails 12 may be placed across the span of trench T at regular intervals, with distance DR separating respective neighboring pairs of rails 12, as described above. Rails 12 may be placed in generally parallel relation to one another, as shown in FIG. 1, and may be generally perpendicular to conduit C. This arrangement of rails 12 allows for lateral translation of conduit C along arrow A within trench T (FIGS. 2 and 3). If trolleys 16 are not already mounted to rails 12, the can now be mounted. In the illustrated embodiment, each trolley 16 may be slid onto the end of each rail 12 so that flanged casters 54 and beam retention channels 58 may engage the upper flange of translation rails 12 and trolley 16 may be moveable only along the longitudinal extent of translation rail 12. Trolley 16 may be adjusted, either through free movement upon translation rail 12 or through actuation of motor 34 of translation driver 32, to a position directly above conduit C. Each of the multiple trolleys 16 are similarly aligned, and conduit support beams 14 may then be placed upon trolleys between rail retention angles 46. Where conduit support beams are separated into multiple sections, as described above, these multiple sections may then be bolted together at end plates 44 to form a continuous conduit support beam 14 spanning the distance span DC of conduit C.

Support structure 20 may then be coupled to curved sheet pile 18 and trolley 16. Suspension members 22 may be extended through corresponding holes in conduit support beams 14, which may be arranged to correspond with J-hook slots (not shown) formed in respective curved sheet piles 18. J-hook 28 may be passed through the slots in curved sheet pile 18 and suspension member 22 may be rotated to engage J-hook 28 with curved sheet pile 18. Nuts 30 may then be threaded against support beams 14 and may place slight upward pressure on subterranean material M beneath conduit C.

Nuts 30 may be further tightened to elevate subterranean material M in conduit C above the bottom surface of trench T to create a gap 64 (FIG. 3) between curved sheet pile 18 and the bottom surface of trench T. Alternatively, material may be excavated from beneath curved sheet pile 18 to create gap 64. In one exemplary embodiment, gap 64 may be about ½ inch or about ¾ of an inch, so that the bottom surface of curved sheet pile 18 may be just clear of the material of the bottom of trench T. In another exemplary embodiment, material may be excavated beneath curved sheet pile 18 to create a "step down" near the apex of curved sheet pile 18, such that a small movement of trolleys 16 in direction A (FIG. 3) may free curved sheet pile 18 from frictional interaction with material at the bottom of trench T.

With subterranean material M and conduit C suspended above the bottom of trench T by support structures 20, material M and conduit C may be moved along direction A from the original position to a relocated position, as shown in FIG. 3. As indicated above, force may be applied to trolleys 16 via any suitable method to drive trolleys 16 along direction A upon translation rails 12. In the illustrated embodiment, motors 34 may be operatively connected to control 40 (FIG. 2), and may draw trolleys 16 along direction A by rotating respective lead screws 39. Motors 34 may be high accuracy motors with feedback mechanisms that provide data to control 40 about the movement of motor 34.

Control 40 may monitor the movements of each respective motor 34 throughout the span of distance DC of conduit C and may continuously ensure that each of motors 34 may be moving an equal amount as every other motor 34. Thus, all of trolleys 16 may advance in direction A at the same rate and at the same time. Advantageously, this control methodology may ensure that conduit C may be kept straight and structurally sound throughout the translation within trench T along arrow A. Alternatively, control 30 may ensure that neighboring trolleys 16 may be longitudinally offset with one another by an amount not to exceed a predetermined level, such as where a flexible conduit is moved as discussed below.

The conduit relocation may be complete when conduit C and subterranean material M are in the desired relocation position, illustrated by dashed lines in FIG. 3. With the translation of conduit C complete, conduit relocation system 10 may be dismantled in substantially the reverse order of assembly (as described above).

First, gap 64 in the relocated position may be backfilled with material, such as a portion of the material originally removed from trench T or a mixture of flowable fill material and gravel. Alternatively, nuts 30 may be adjusted to allow suspension members 22 to lower, thereby resting curved sheet pile 18 upon the bottom of trench T. When curved sheet pile 18 is adequately supported, either by material backfilled under sheet pile 18 or by lowering sheet pile 18, nuts 30 may be removed from beam connection ends 24 of suspension members 22, and suspension members 22 may then be removed from engagement with conduit support beam 14 and curved sheet piles 18.

With trolleys 16 now decoupled from curved sheet pile 18, conduit support beams 14 may be dismantled and removed from trolleys 16. Trolleys 16 may optionally be removed from engagement with translation rails 12 and translation drivers 32. Translation rails 12 may be removed from their positions spanning trench T, leaving conduit C, subterranean material M, and curved sheet pile 18 remaining in trench T. Curved sheet pile 18 may be removed in a similar manner as it was installed, or it may be left installed beneath conduit C and subterranean material M. Finally, trench T may be filled in, such as with the material that was originally removed during excavation of trench T.

As indicated above, junction points J may be provided at each end of a conduit section C. Junction points J may be a subterranean or above-ground junction box, for example, or may be a manhole leading to a portion of conduit C. Junction points J may allow for disconnection of conduit C from adjacent sections, thereby allowing conduit C to be moved without any bending thereof. Where conduit C contains cables, such as electrical or fiber optic wires, junction joint J may be opened to expose cable slack or cable disconnect points in the manhole to facilitate relocation of conduit C without stretching or straining the cables contained therein.

Moving junction point J may be accomplished by simply relocating a junction box, where one is provided. Where junction point J is a manhole, the concrete surrounding the manhole may be removed, and another manhole may be installed at the end of the conduit C in the relocated position. A modular manhole may be installed at the end of conduit C in the relocated position. A modular manhole may be used which is capable of being broken down and moved for future relocations of conduit C. Where conduit C is moved but the neighboring conduit section remains in its original location, a transverse conduit section or "elbow" (not shown) may be provided at junction point J to span the gap created between the relocated conduit C and the neighboring unmoved conduit section.

In some instances, several sections of conduit C may be moved sequentially, so an essentially unlimited amount of previously routed conduit may be laterally translated section-by-section. For example, as shown in FIG. 1, conduit C may have a span or distance DC of about 750 feet. Any cables contained within conduit C may be disconnected, or may have cable slack collected and exposed, at junction points J disposed at either end of the 750 foot section of conduit C. Conduit C may then be relocated as described above. With one section of conduit C successfully translated, the next neighboring section of conduit C may then be moved in a similar fashion. With both sections relocated, cables may be reconnected at junction point J, or the slack in the cables may be collected and stored at junction point J. In this manner, a plurality of sections of conduit C may be moved to ultimately translate an entire network of underground telecommunications cables.

In another embodiment, conduit C may be translated upwardly or downwardly in addition to, or in lieu of the lateral translation described above. For example, some municipal or civil projects may seek to raise or lower conduit C to avoid adversely affecting a new surface structure such as light rail tracks, new roadways, other conduits, and the like. Just as the threaded engagement of nuts 30 with beam connection end 24 of suspension member 22 may be used to lift sheet pile 18 from the bottom of trench T, so may they be used to lift or lower sheet pile 18 and conduit C to a new vertical position. To prevent uneven stresses from forming with conduit C, all of nuts 30 may be advanced serially by small amounts. Put another way, for each small movement of one part of sheet pile 18 resulting from the tightening or loosening of nuts 30, the same small movement of the other parts of sheet pile 18, and of other upstream or downstream sheet piles 18 may also be performed.

Alternatively, all of nuts 30 may be advanced simultaneously, such as by a series of synchronized motors operatively coupled to nuts 30 and controlled by controller 40. Moreover, it is within the scope of the present disclosure that any suitable method of effecting the vertical translation of sheet pile 18 may be used, such as cable/winch systems, linear actuators, hydraulic or mechanical jacking systems, cranes, and the like.

In yet another alternative embodiment, conduit support beams 14 and/or translation rails 12 may be vertically translated rather than suspension members 22. For example, lifting devices (i.e., screw jacks or hydraulics lifts, not shown) may be disposed between support beams 14 and translation rails 12. With curved sheet piles 18 supported by respective support structures 20, the lifting devices may be actuated to lift or lower translation rails 12 with respect to support beams 14 to a vertically relocated position. In still another alternative, the lifting devices may be placed between support beams 14 and the ground to lift or lower both support beams 14 and translation rails 12. In addition, where conduit C may only be moved vertically, trolleys 16 may be eliminated so that conduit support beams 14 may rest directly on, and are coupled to rails 12.

Figure 8:
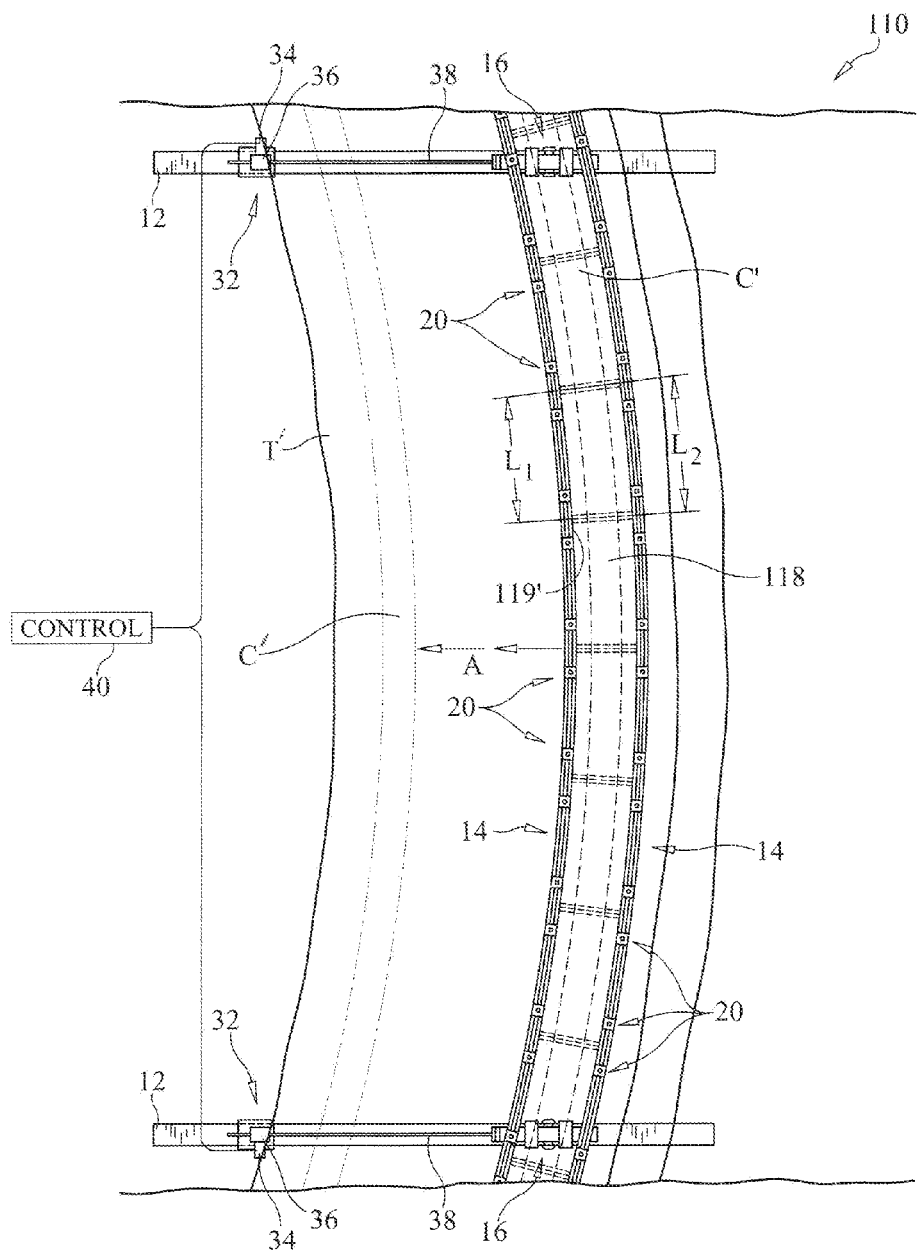
FIG. 8 illustrates a top plan view of a conduit relocation system for curved conduit in accordance with the present disclosure.

Referring now to FIG. 8, in an alternative embodiment, conduit relocation system 110 may be used for translating curve to conduit C. In this embodiment, curved sheet piles 118 may be trapezoidally shaped having a first side 119 with a first length L1, and a second side 119' with a second length L2, where L2 is less than L1. When multiple curved sheet piles 118 may be placed adjacent one another as shown in FIG. 8, a generally curved or arcuate overall profile may be formed. Similarly, conduit support beams 114 may be also curved to follow the overall profile created by curved sheet piles 118. Curved conduit C' may be translated in a similar manner as described above with respect to straight conduit C, as illustrated in FIG. 8. Respective ends of curved conduit C' may be trimmed or expanded after movement as required to accommodate the altered geometrical arrangement with respect to adjacent upstream and downstream conduits.

As indicated above, yet another embodiment may include a flexible conduit (not shown) that may be moved incrementally along its length without disconnecting individual sections of conduit using a "wave" movement method. Such flexible conduits may tolerate a certain amount of "bend" or deflection, which can be utilized in conjunction with a system of the present disclosure to move the conduit incrementally along a sufficient conduit length. If the desired net lateral movement of the conduit is known, and the ability of the conduit to withstand a certain deflection may also be known, then conduit relocation system 10 may be designed to accomplish the net movement over a distance large enough to ensure that the deflection of the conduit may not exceed the conduit's ability to safely deflect.

More specifically, control 40 may be used to ensure that neighboring trolleys 16 may be longitudinally offset with respect to one another. Control 40 may monitor this offset, and may be programmed with distance DR between respective pairs of translation rails 12. Control 40 may use these two pieces of information to determine the bend in conduit C, and may control the speed and/or movement of neighboring trolleys 16 to ensure that the offset does not result in a deflection exceeding a predetermined amount. The predetermined deflection may depend on the flexibility of conduit C. Control 40 may monitor all pairs of trolleys 16 in a similar fashion. The number of trolleys 16—and, correspondingly, the number of translation rails—need to accomplish a translation of conduit C may be expressed by the following formula (I):

$$N_{TROLLEY} = D_{TRANS}/D_{TROLLEY} \quad (I)$$

Where $N_{TROLLEY}$ is the number of trolleys needed to accomplish a translation of conduit C across a distance $D_{TRANS}$ given that the maximum offset distance between neighboring trolleys is $D_{TROLLEY}$.

Thus, when a first or leading trolley 16 begins to move, the neighboring downstream second trolley 16 may begin to move as soon as $D_{TROLLEY}$ may be established between them. A third trolley 16, i.e., the downstream trolley neighboring second trolley 16, will begin to move when $D_{TROLLEY}$ is established between the second and third trolleys 16, and ($2 \times D_{TROLLEY}$) may be established between the first and third trolleys 16. Thus, the trolleys may move in a "wave" pattern.

Figure 9:
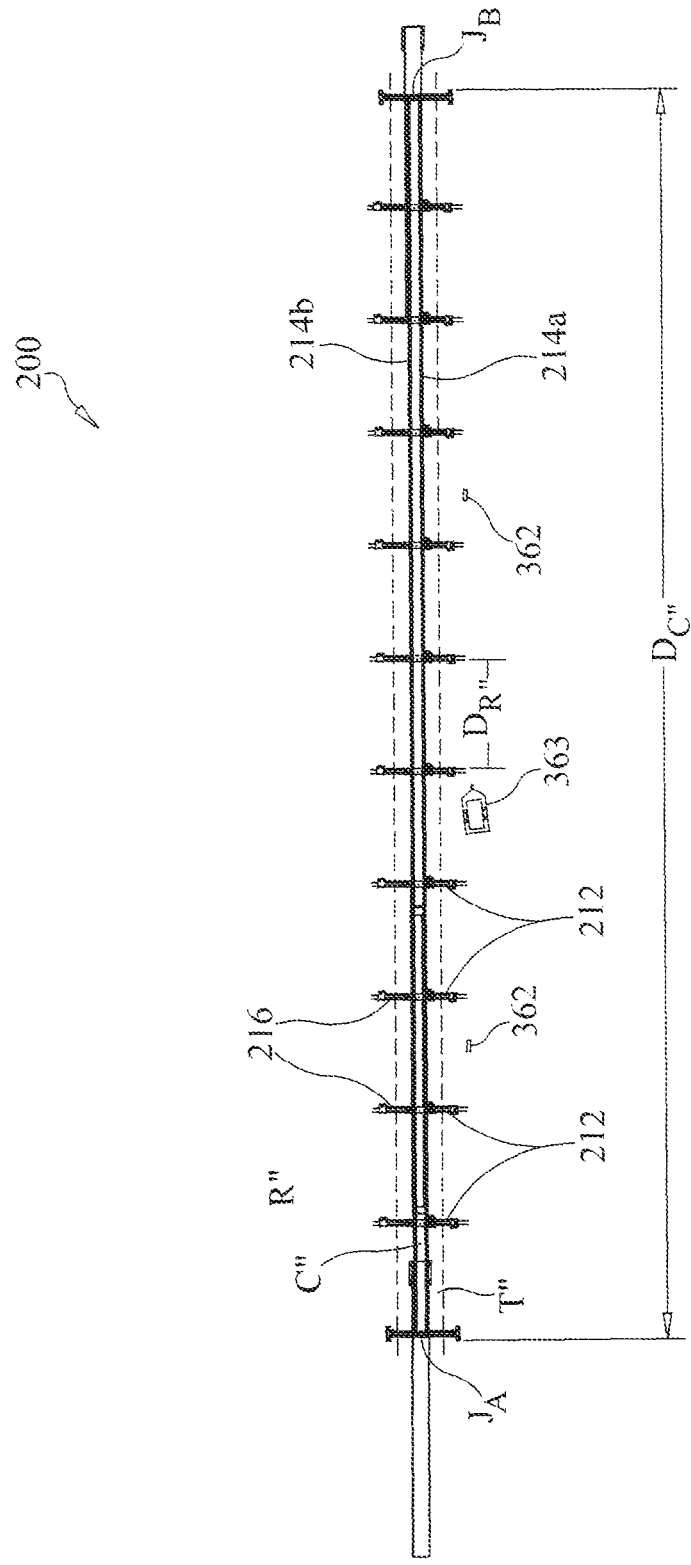
FIG. 9 illustrates a top plan view of a conduit relocation system in an alternate embodiment of the present invention.

Referring now to FIG. 9, an alternate embodiment of a conduit relocation system 200 may include a plurality of translation rails 212 of sufficient length to span an excavated trench T" having conduit C" located therein. A pair of conduit support beams 214a, 214b may be disposed atop translation rails 212 by means of trolleys 216 and above conduit C", so that conduit support beams 214a, 214b may be used to lift, lower and/or support conduit C" as conduit support beams 214a, 214b move via the trolleys 216, each of which may translate along a respective translation rail 212, as described in further detail below. Conduit support beams 214a, 214b extend across a distance $D_C"$, which may generally be the distance between junction points $J_A$ and $J_B$ disposed at opposite ends of conduit C".

In one exemplary embodiment, illustrated in the Figures, $D_C"$ may be about 500 to about 1000 feet in length, such as about 750 feet in length. Generally, $D_C"$ is a distance determined by the original installers of conduit C" between junction points $J_A$ and $J_B$. For example, any number of translation rails 212 may be placed along the width of trench T" to support conduit C" along the extent of support beams 214a, 214b. In the illustrated embodiment of FIG. 9, translation rails 212 are separated by distance $D_R"$, which is calculated to provide adequate support for the weight of beams 214a, 214b, curved sheet pile 218 (as disclosed below), conduit C" and any surrounding subterranean material.

In this illustrated embodiment of FIG. 9, distance $D_R"$ between respective pairs of translation rails 212 is about 40 feet, which is an appropriate distance for an exemplary conduit C" used for underground routing of telecommunication cables. In this exemplary embodiment, conduit C" is made of a clay material and has a square cross-sectional shaped with cross-sectional dimensions of about 13 inches by 13 inches. Conduit C" may be buried beside roadway R", for example, such that conduit C" is translatable by conduit relocation system 200 in order to provide additional space to widen roadway R".

However, it is within the scope of the present disclosure that conduit relocation system 200, like conduit relocation system 10, described above, may be adapted to a variety of uses and scales, in which the relative sizes and weights of translation rails 212, conduit support beams 214a, 214b and conduit C" (or other subterranean structure) may vary widely. In such alternative embodiments, distance $D_R"$ between translation rails 212 will also vary widely, as will distance $D_C"$ representing the length of the structure to be translated. To accommodate this variability of scale, distance $D_R"$ may be expressed as a fraction of distance $D_C"$. This fraction may be between about 1/12 and about 1/25, for example. Similarly, the number of translation rails 212 required to accommodate distance $D_C"$ will also vary depending on the parameters of the system to be moved, and may be as few as two or three translation rails 212 or as many as several dozen of translation rails 212, for example.

Figure 10:
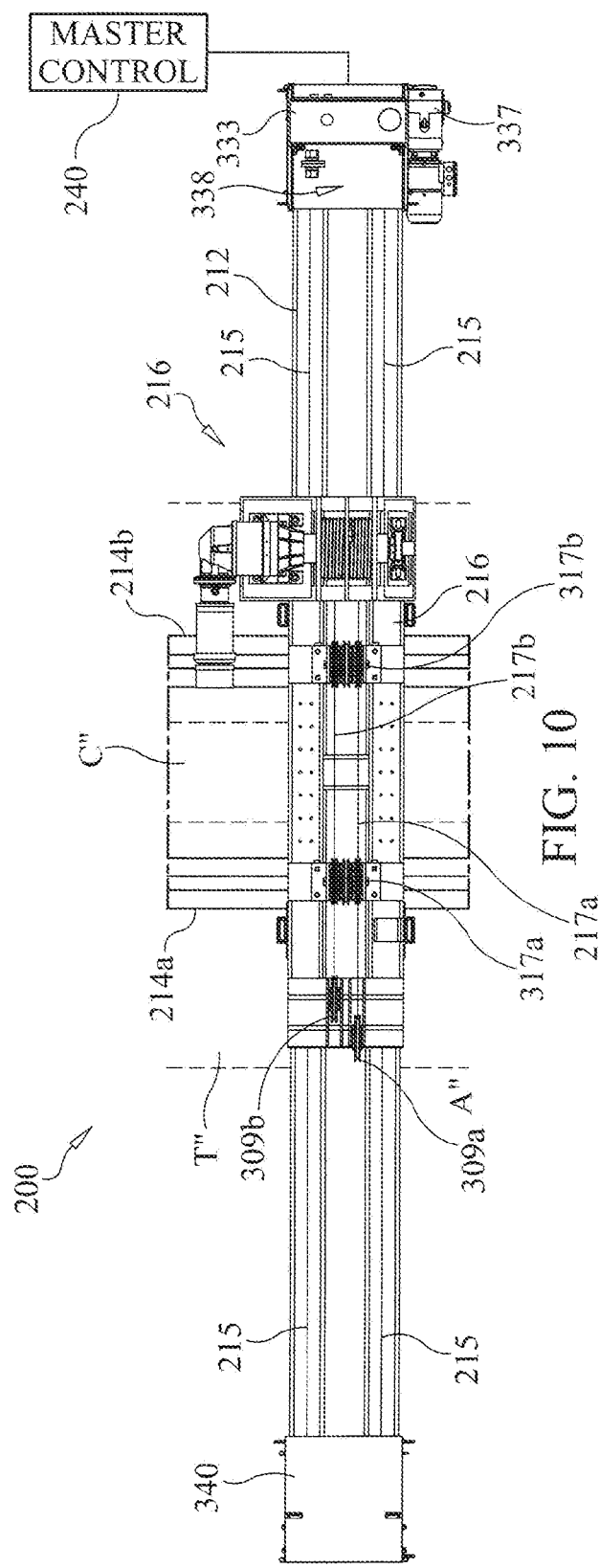
FIG. 10 illustrates a top plan view of an enlarged portion of FIG. 9 in an embodiment of the present invention.

Referring now to FIG. 10, a top view of a portion of conduit relocation system 200 is shown including a translation rail 212 and a section of conduit support beams 214a, 214b. Conduit C" is disposed underneath and generally centered between conduit support beams 214a, 214b in an initial or original position within trench T". As will be described in detail below, support beams 214a, 214b and conduit C" are translatable in the direction of arrow A" within trench T" to relocate conduit C" to a second or relocated position.

To facilitate the translation of support beams 214a, 214b and, hence, conduit C", across translation rails 212, a trolley 216 is disposed on an upper surface of each translation rail 212. As discussed below, trolleys 216 provide a smooth rolling interface on respective translation rails 212, thereby minimizing the force required to translate conduit C" within trench T". In the illustrated embodiment as shown in FIGS. 10 and 11, translation rails 212 are comprised of a pair of steel tubes placed parallel to each other to allow the trolleys 216 to roll thereon, as described in more detail below.

To translate trolley 216 across translation rail 212, one or more cables 215 are connected to the trolley 216, on opposite sides thereof, for pulling the trolley 216 in either direction across the translation rail 212. Specifically, the cables 215 may be connected to a pulley and drive system, disposed on one or both ends of the translation rail 212 for moving the trolley 216 laterally across the translation rail 216.

In addition, movement of the support beams 214a, 214b up and down and, hence, conduit C" up and down with the trench T', cables 217a, 217b may extend from double drum 322 on the trolley 216. Cable 217a may extend to single sheave wheel 309a, around single sheave wheel 309a and to sheave wheels 317a. Cable 217a may then descend from sheave wheels 317a and engage the support beam 214a disposed therebeneath, as described in more detail below. Moreover, cable 217b may extend to single sheave wheel 309b, around single sheave wheel 309b and to sheave wheels 317b. Cable 217b may then descend from sheave wheels 317b and engage the support beam 214b disposed therebeneath. Thus extending or pulling cables 217a, 217b via double drum 322 may play out or pull back cables 217a, 217b and, thus, ascend or descend support beams 214a, 214b disposed therebeneath, as described below.

Figure 11:
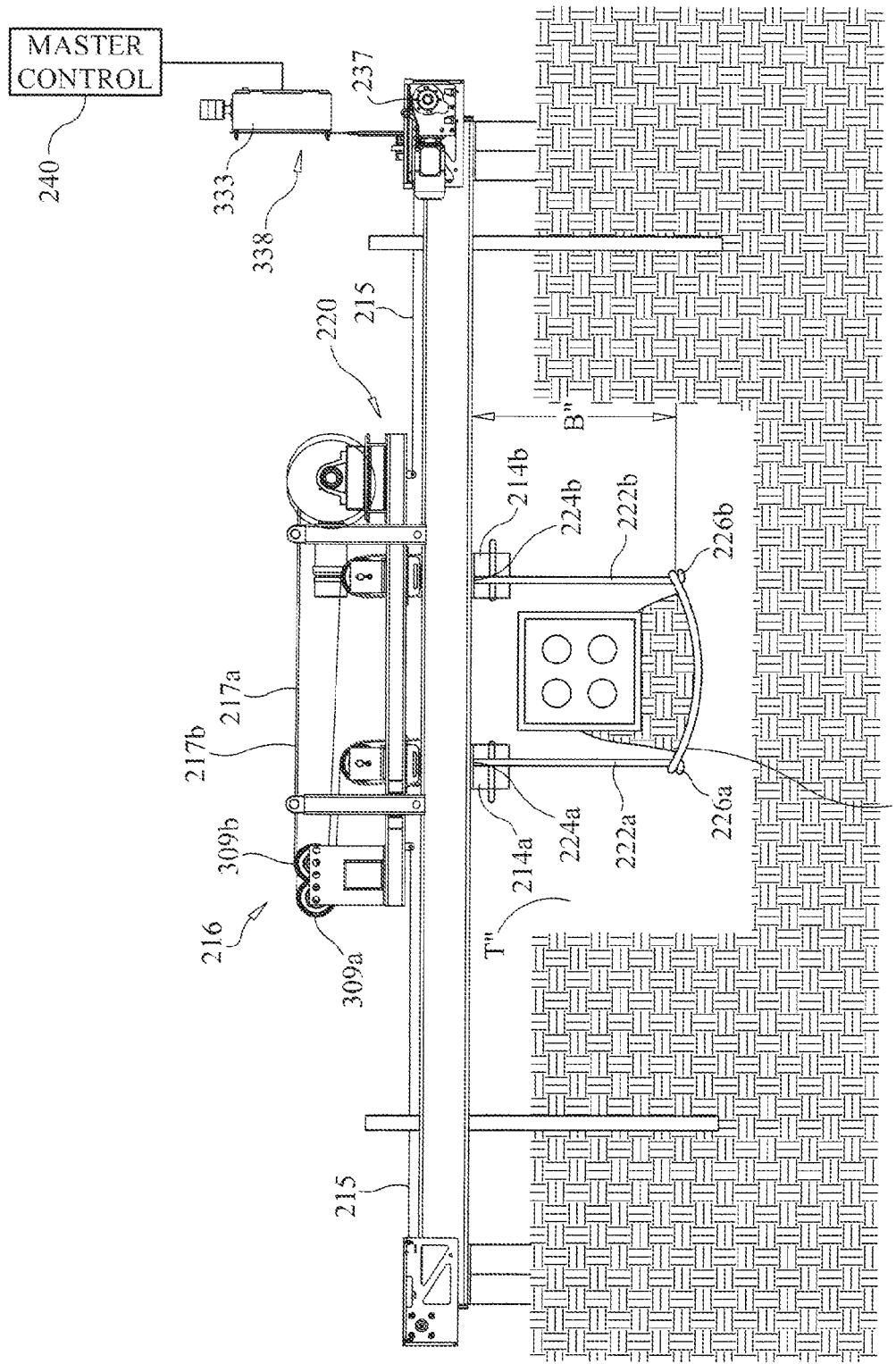
FIG. 11 illustrates an elevation view of the enlarged portion shown in FIG. 10 in an embodiment of the present invention.

Referring now to FIG. 11, curved sheet pile 218 is disposed beneath conduit C" and coupled to trolley 216 via support structure 220. Support structure 220 includes suspension members or rods 222a, 222b having beam connection ends 224a, 224b coupled to conduit support beams 214a, 214b, respectively. Rods 222a, 222b also have pile connection ends 226a, 226b coupled to curved sheet pile 218. Specifically, beam connection ends 224a, 224b of rods 222a, 222b, respectively, are attached at regular intervals to the conduit support beams 214a, 214b along the length of the conduit C". Specifically, beam connection ends 224a, 224b may be threaded, and attachment plates may be disposed on a top surface of the conduit support beams 214a, 214b. Nuts (not shown) may be disposed thereon to hold the beam connection ends 224a, 224b in place along the length of the conduit support beams 214a, 214b and, hence, the conduit C". Pile connection ends 226a, 226b include J-hooks adapted to pass through slots (not shown) formed in curved sheet pile 218 in one rotational orientation and engage sheet pile 218 in another rotational orientation, thereby coupling support structure 220 to sheet pile 218.

Conduit support beams 214a, 214b, therefore, may be disposed beneath the translation rails 212 and may be operatively coupled to the trolleys 216 by means of suspending from a cables 217a, 217b. Thus, conduit support beams 214a, 214b may be translated via the movement of the trolleys 216, along translation rails 212 via cables 215. In an alternative embodiment, as described more fully below, the conduit support beams 214a, 214b may be utilized to lift and/or lower the conduit C". In a still further embodiment, the conduit support beams 214a, 214b may be translated via movement of the trolleys 216 laterally across the translation rails 212 and may be lifted and/or lowered by the trolleys 216.

Figure 12:
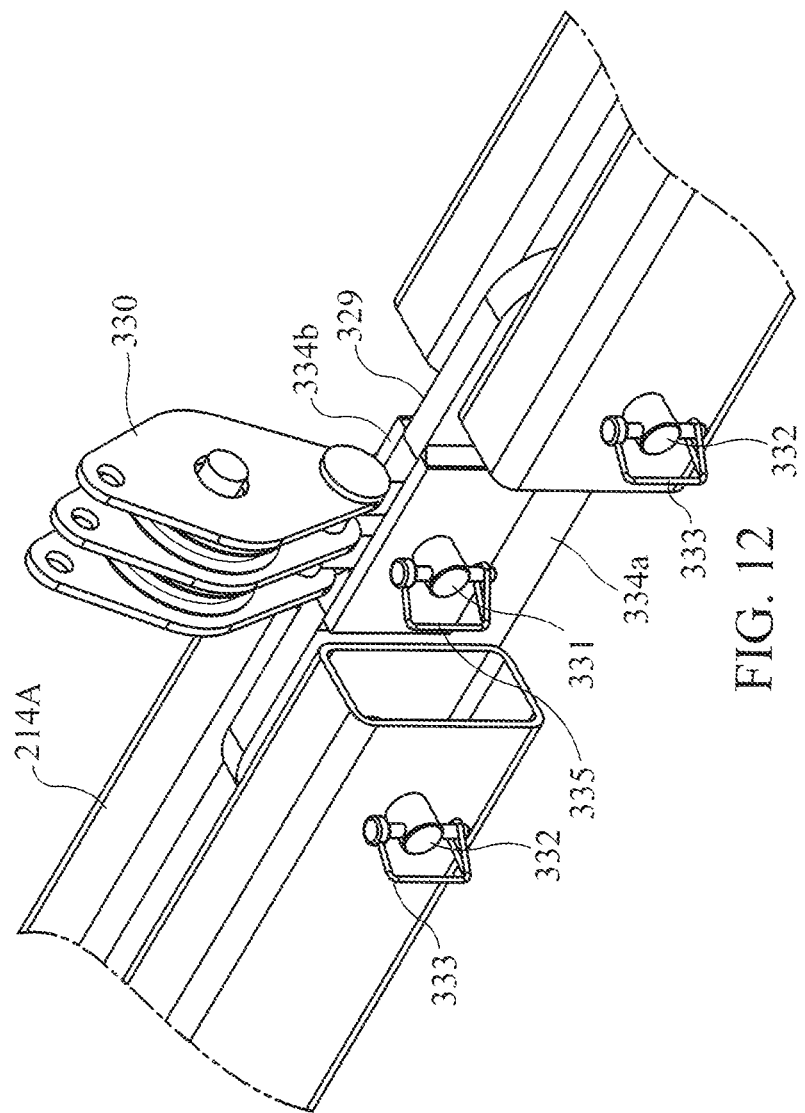
FIG. 12 illustrates a close-up perspective view of a longitudinal conduit support linkage in an embodiment of the present invention.

Beneath the plurality of translation rails 212, conduit support beams 214a, 214b may join from end to end across distance $D_C$", spaced adequately between their ends, beneath each translation rail 212 to allow placement of conduit support beam saddle 329, as illustrated in FIG. 12. Generally, conduit support beams 214a, 214b are each preferably formed using a pair of steel tubes placed parallel to each other, being adequately spaced at each end to allow a pocketed space to allow each end of conduit support beam saddle 329 to be placed therein. Holes may be located at each end of conduit support beams 214a, 214b that align with holes in each end of conduit support beam saddle 329, thus allowing support pins 332 to be inserted, passing through both parts simultaneously until shouldering against the side of each of the conduit support beams 214a, 214b. Retaining clip 333 may be disposed through holes in the support pin 332, thus holding the support pin 332 in place. The conduit support beam saddle 329 may be formed with a pair of side plates 334a, 334b, each welded on each side of the main body of the conduit support beam saddle 329, such that the pair of side plates 334a, 334b forms a pocketed space large enough to insert a clevis eye of double sheave block 330. A hole located at the upper center of support beam saddle 329, and corresponding holes disposed in the pair of side plates 334a, 334b align with the hole in the clevis eye (not shown) disposed on a bottom of double sheave block 330 after insertion into the pocketed space between the pair of side plates 334a, 334b. Support pin 331 may be inserted, passing through the pair of side plates 334a, 334b and the hole in the clevis eye of the double sheave block 330 until shouldering against the pair of side plates 334a, 334b. Retaining clip 335 may be used to hold support pin 331 in place, opposing the shoulder of support pin 331. The double sheave block 330 may be operatively connected via cable 217a to trolley 216, as described above. Thus, the conduit support beams 214a, 214b may be both translated along translation rail 212, and/or may be raised or lowered cables 217a, 217b disposed through double sheave block 330.

Figure 13:
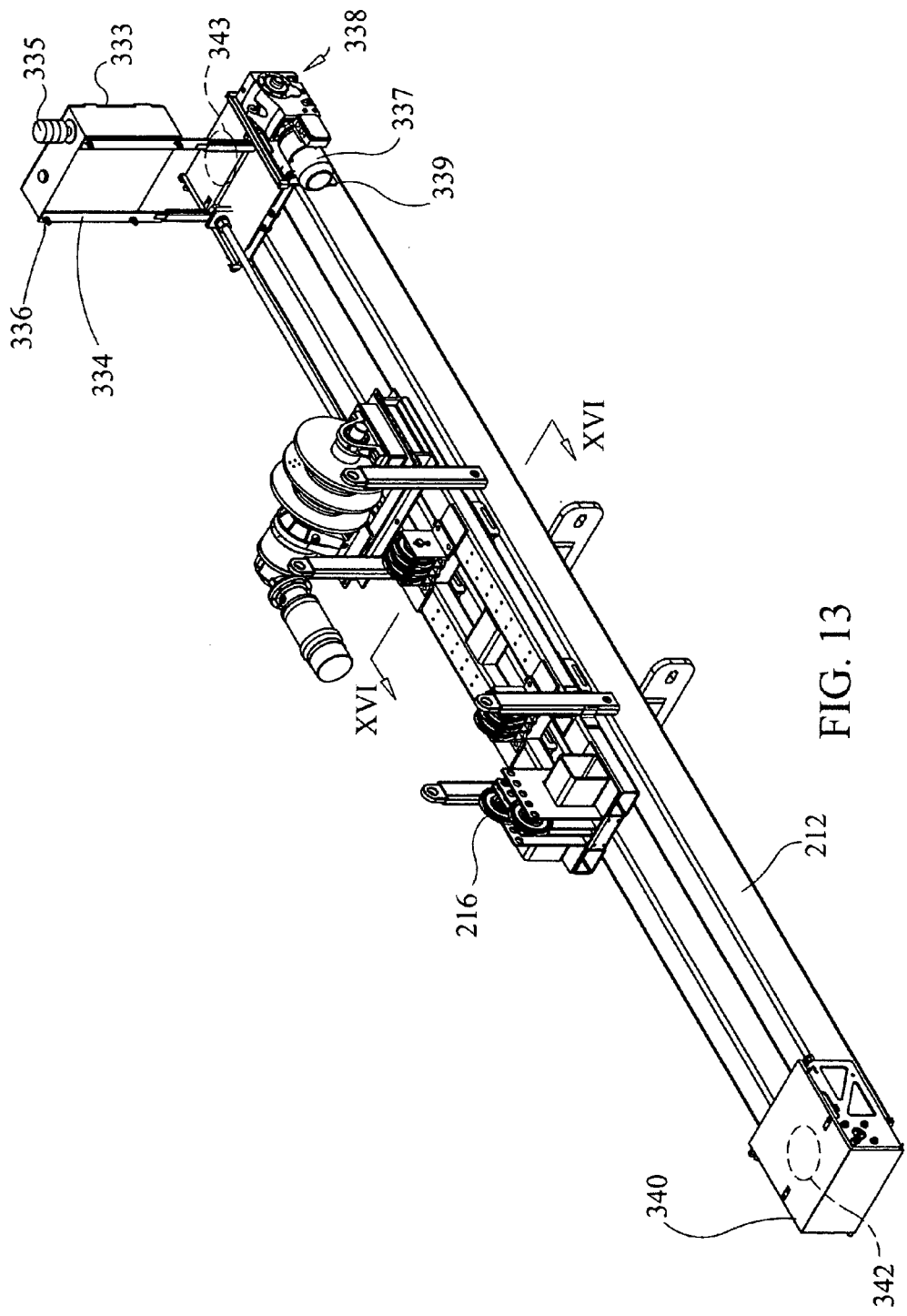
FIG. 13 illustrates a perspective view of a lateral support and trolley assembly in an embodiment of the present invention.

Referring again to FIGS. 10, 11, translation system 200 includes translation driver 338 to provide the requisite force on cables 215 for translating the trolley 216 and, thus, conduit support beams 214a, 214b along translation rails 212. Translation of each of the trolleys 216 may be accomplished via the translation driver 338, which may include motor 337 operatively coupled to trolley 216 via cables 215. Specifically, and as illustrated in FIG. 13, translation of one or more of the trolleys 216 may be accomplished via control box 333 attached to the end of translation rail 212. Specifically, motor 337 may transmit necessary torque to turn pulley 343, attached to the end of the translation rail 212. The cables 215 (not shown in FIG. 13), adequately sized to transmit the necessary force to translate the trolleys 216 and, effectively, the conduit support beams 214a, 214b, may be affixed to trolley 216 at the end closest to the translation driver 338 via sprocket 343, and may be routed to the opposing end of trolley 216 (such as within the tubular portions of the translation rail 212) by first wrapping around a sprocket 343 and being affixed to the rotating member of translation driver 338, then reversing direction, wrapping around the sprocket 343 a second time, and being affixed to a sprocket 342 attached to the opposite end of translation rail 212 by bracket 340, and then ending affixed to the opposing end of trolley 216. Thus, the motor 337, when activated by control 333 via master control 240 (as shown in FIGS. 10, 11), may drive the trolley 216 laterally across the translation rail 212, whether in one direction (such as toward the end of the translation rail 212 with the sprocket 342) or towards the other (such as toward the motor 337) via cables 215. The support beams 214a, 214b may be operatively coupled to the trolley 216, as described more fully below, and thus are also translated, along with the curved sheet 218 and, ultimately, the conduit C".

Figure 14:
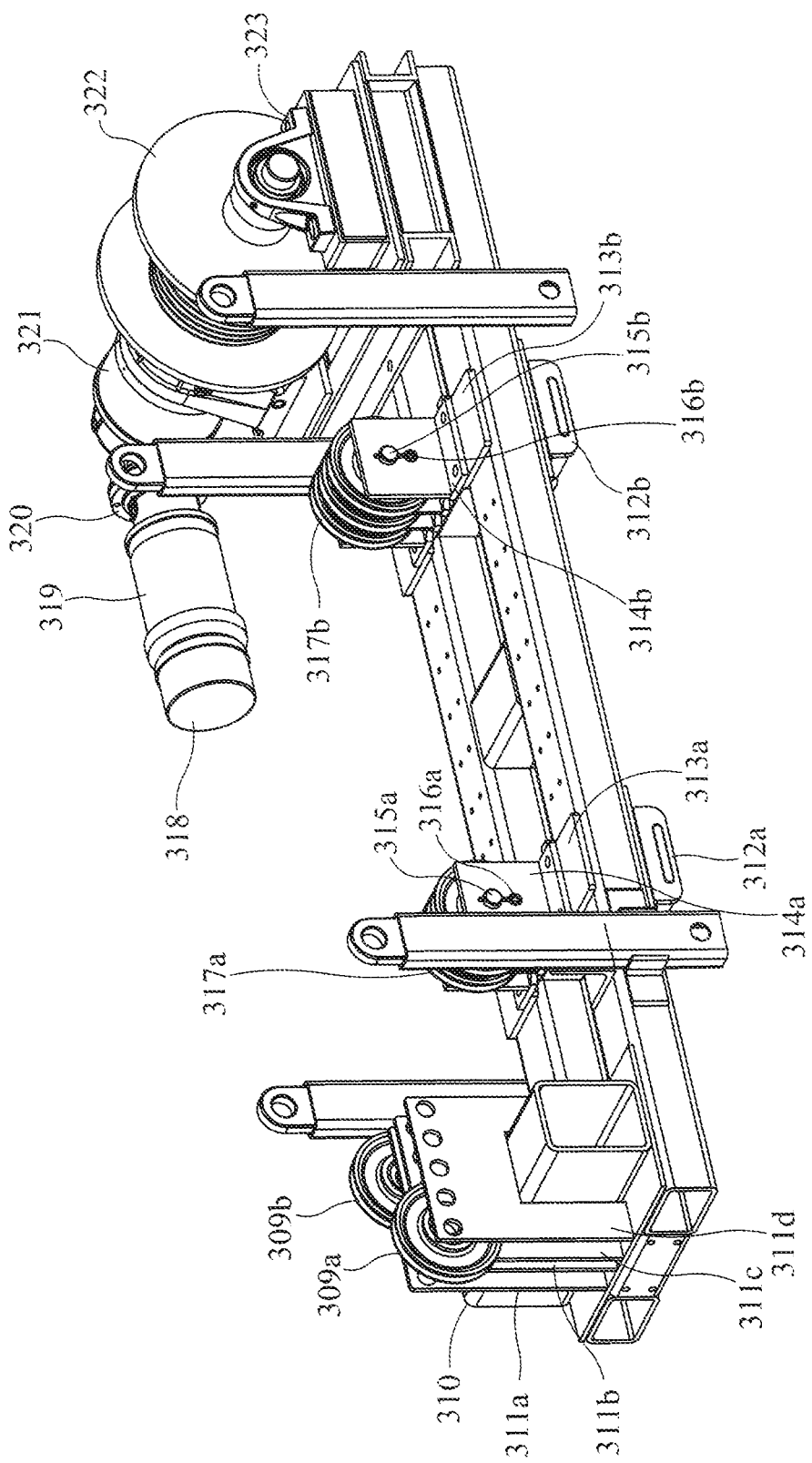
FIG. 14 illustrates a close-up perspective view of a trolley assembly in an embodiment of the present invention.

As illustrated in FIG. 14, a close-up view of trolley 216 is provided, without cables 217a, 217b or cables 215. Conduit support beams 214a, 214b (not shown in FIG. 14) may be supported beneath trolley 216, directly beneath a pair of sheave wheels 317a, 317b. Specifically, cables 217a, 217b (not shown in FIG. 14 for purposes of clarity) may descend from the pair of sheave wheels 317a, 317b and may wrap around triple sheave block 330 (as disposed on each of the conduit support beams 214a, 214b, as shown and described with reference to FIG. 12). It is within the scope of the present invention that the conduit relocation system 200 may be adapted to accommodate varying sizes of conduit C" disposed therebeneath by movement of sheave wheels 317a, 317b toward each other or away from each other. If a large volume, including conduit C", is required for relocation, the sheave wheels 317a, 317b may be disposed far apart from each other and may be bolted to holes far apart from each other. Alternatively, if only a small, narrow volume is required for relocation, then the sheave wheels 317a, 317b may be disposed relatively closed to each other by being bolted in holes close to each other.

Figure 15:
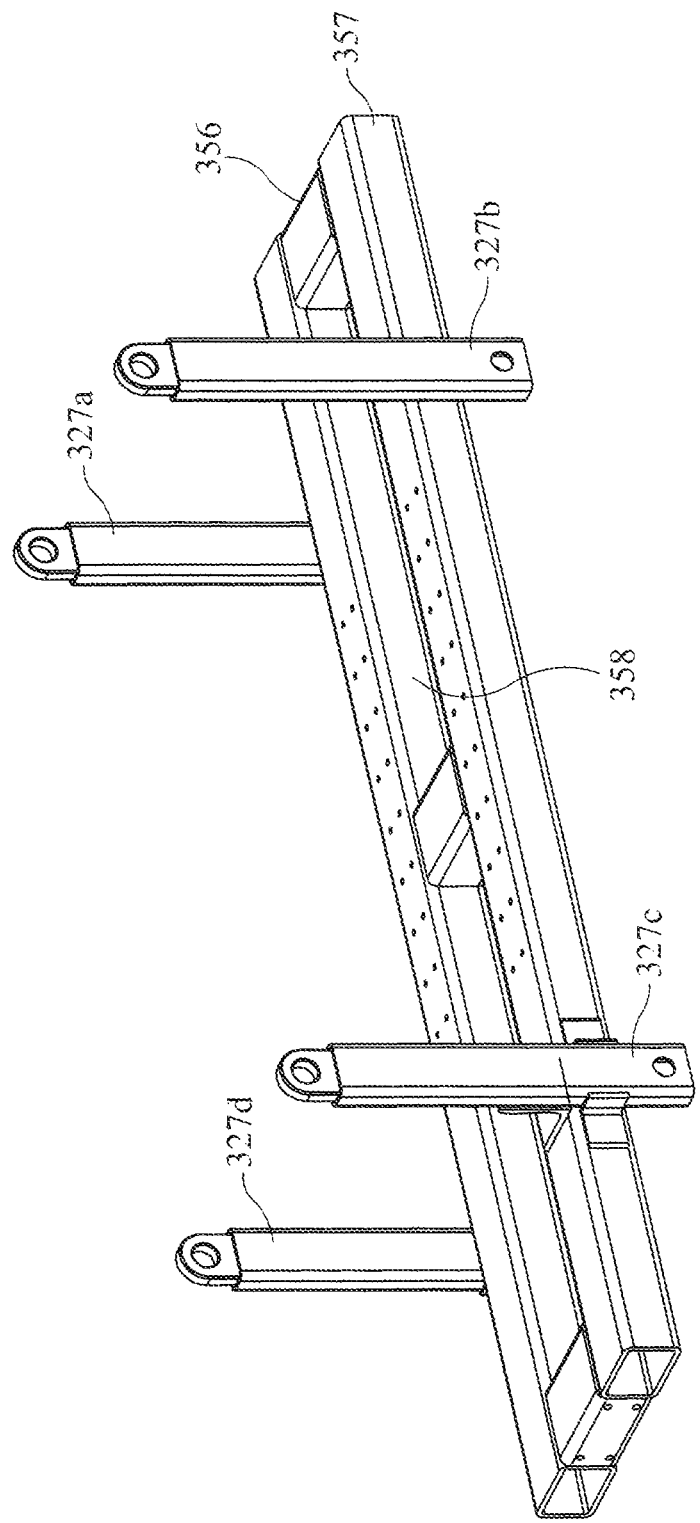
FIG. 15 illustrates a close-up perspective view of a trolley assembly frame in an embodiment of the present invention.

As illustrated in FIG. 15, the trolley 216 may comprise, as a base, evenly spaced slide body side beams 357 (as illustrated in FIG. 15, showing the base of each trolley 216), which may be evenly separated by center spacer 356 forming a retention channel 358. Adjustment brackets 313 may form a T-shaped steel structure that fits in the retention channel 358. A pair of adjustment brackets 313a, 313b (shown in FIG. 14) may be bolted to one of a series of holes patterned on the top surfaces of the slide body side beams 357. A pair of triple sheave brackets 314a, 314b may support the rotating sheave wheels 317a, 317b, respectively that may, by using bearings on their centers, revolved around shafts 315a, 315b which are retained in position shouldered against the one side of the triple sheave brackets 314a, 314b, respectively, and by pins 316a, 316b, respectively.

Each trolley 216 may slide along each translation rail 212 via a pair of roller packs 312a, 312b disposed beneath the trolley 216, as illustrated in FIG. 14. Preferably, the roller packs 312a, 312b may be bolted to opposing bottom surfaces of slide body side beams 357 by use of holes (not shown) that are patterned into the slide body side beams 357, such that the centerline of the sheave wheels 317a, 317b coincide with the centerline of the roller packs 312a, 312b and at the same time cover the center of conduit support beams 214a, 214b.

Moreover, each trolley 216 may include a pair of single sheave wheels 309a, 309b that may be adjusted to maintain a relative distance with the pair of triple sheave clusters 317a, 317b as adjustment brackets 313a, 313b may be moved along the retention channel 358 to new positions. The pair of single sheave wheels 309a, 309b may sit atop sheave bracket 310, which may be bolted or otherwise disposed on slide body side beams 357. The single sheave wheel 309a may have a first pair of vertical walls 311a, 311b disposed perpendicular to main bracket 310 and may be integrally connected to main bracket 310, whereupon the single sheave wheel 309a may sit therebetween. A second pair of vertical walls 311c, 311d may also be disposed perpendicular to main bracket 310 and may also be integrally connected to main bracket 310, and single sheave wheel 309b may sit therebetween. The axis of single sheave wheel 309a is set coincident to one pair of a plurality of pairs of holes disposed within the vertical walls 311a, 311b. Each of the pairs of holes may support the single sheave wheel 309a, allowing it to rotate via the single sheave wheel's bearings. Moreover, the axis of single sheave wheel 309b is set coincident to one pair of a plurality of pairs of holes disposed within the vertical walls 311c, 311d. Thus, each of the pairs of holes within vertical walls 311c, 311d may support the single sheave wheel 309b, allowing it to rotate via the single sheave wheel's bearings.

Aligning to and working in conjunction with the pair of triple sheave wheels 317a, 317b and pair of single sheave wheels 309a, 309b may be double drum 322. Double drum 322 may be supported by bearing block 323 on one end and gear reducer 321 on the opposite end. Translation of the conduit support beams 314a, 314b may be accomplished, either independently, or simultaneously, via controls located in control box 333 that may be connected to and may activate motor 319. Thus, a gearbox 320 and gear reducer 321 may revolve with the necessary torque to turn double drum 322 and wind up cables 217a, 217b (not shown in FIG. 14). Specifically, as described above, cable 217a (preferably, made of steel for requisite strength) may be rolled up on one drum of the double drum 322, then routed between single sheave wheel 309a, triple sheave wheels 317a, and ultimately to the first double sheave block 330, attached to, for example, the conduit support beam 214a disposed beneath the trolley 216. In addition, cable 217b (also preferably made of steel for requisite strength) may be wound on a second drum of the double drum 322, then routed between single sheave wheel 309b, triple sheave wheels 317b, and ultimately to a second double sheave block 330 attached to, for example, the conduit support beam 214b disposed beneath the trolley 216. Torque may be transmitted independently to each double sheave block 330 on the conduit support beams 214a, 214b, respectively, and may lift or lower each of the conduit support beams 214a, 214b by any distance B", as illustrated in FIG. 11. Thus, triple sheave wheels 317a, 317b may independently be controlled via a separate cable disposed from the double drum 322. Alternatively, in a separate embodiment not shown herein, the double drum 322 may be replaced with a single drum, and a single cable may be routed between the single drum, a single sheave wheel (disposed where sheave wheels 309a, 309b are positioned in FIG. 14), and through sheave wheels disposed in the general location of the triple sheave wheels 317a, 317b, as illustrated in FIG. 14. Thus, a single cable may be utilized to control the up and down movement of the conduit C".

Preferably, when motor 319 is deactivated, brake 318 automatically engages with sufficient holding force, in combination with gear reduction caused by gear reducer 321 to sustain the combined weight of the conduit C", any supporting media such as dirt disposed around conduit C", and the conduit relocation system 200 equipment, as described herein. However, for safety, it is preferred to include a chain or cable (not shown) to temporarily span from translation rail 212 to either or both of the conduit support beams 214a, 214b.

Figure 16:
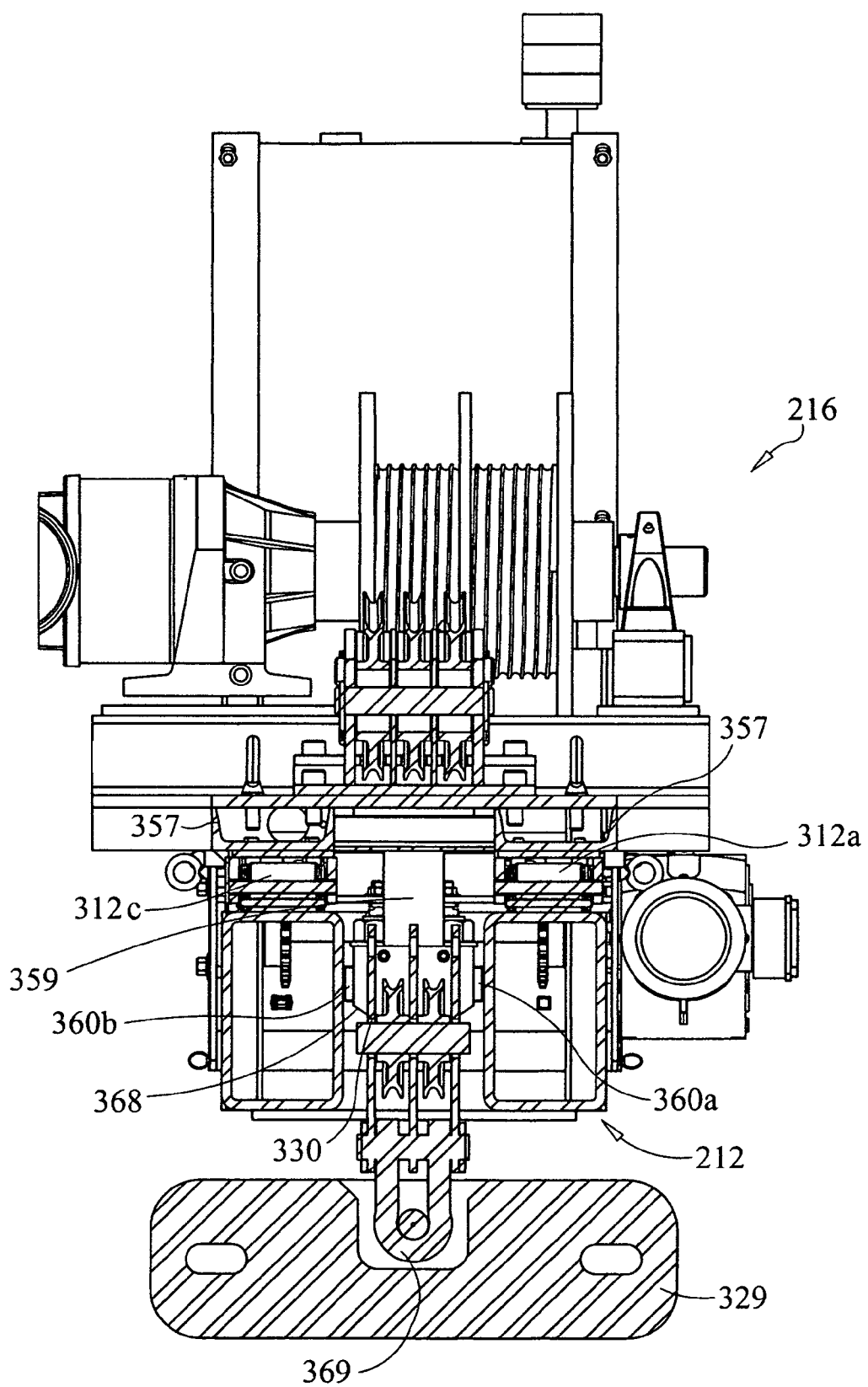
FIG. 16 illustrates a cut-away view along line XVI-XVI from FIG. 10 in an embodiment of the present invention.

FIG. 16 illustrates a cross-sectional view of the trolley 216 along line XVI-XVI, as shown in FIG. 13. Specifically, the trolley 216 may be disposed over the top surface of translation rail 212, comprising two steel tubular portions placed side by side. Roller packs 312a, 312c may be disposed on the bottom surface of the slide body side beams 357, and move across the top surface of the two tubular portions of translation rail 212, thereby facilitating smooth rolling translation of the trolley 216 and, thus, the conduit support beams 214a, 214b disposed therebeneath (not shown in FIG. 16), such as in the direction A", as illustrated in FIG. 10. Generally, guiding of the trolley 216 is accomplished by means of two cam rollers 360a, 360b, each of which may be situated and held on the bottom edge of cam bracket 359 and affixed, by means of bolts, to the bottom side at each end of trolley 216. As depicted in FIG. 16, the outside diameters of each cam roller 360a, 360b contacts the vertical plane of its corresponding inside edge of each tubular portion of translation rail 212. Affixed to cam bracket 359, the angles on the leading edge of guide 368 may position and guide the trolley 216 as it is placed in position onto the translation rail 212 during installation.

Also shown in FIG. 16 is saddle 329 that may sit between respective portions of conduit support beams 214a or 214b, as shown and described with respect to FIG. 12. The saddle 329 may adjoin terminal ends of sections of conduit support beams 214a or 214b, as described above. As shown, clevis eye 369 of double sheave block 330 may be attached to the saddle 329. The double sheave block 330 may interconnect with the trolley 216 via cables 217a or 217bb (not shown in FIG. 16), that may be used to raise and/or lower the double sheave block 330, the saddle 329, the conduit support beams 214a and/or 214b and, ultimately, the conduit held in place beneath the conduit support beams, 214a, 214b.

Referring again to FIG. 15, the trolley 216 may be constructed with four vertical posts 327a, 327b, 327c and 327d, positioned at each corner of the trolley 216. The lower edges of posts 327a-327d may be beneath the bottom leading edge of guide 358 such that the trolley 216 may rest on a truck for transport without disassembly thereof. Moreover, the upper ends of posts 327a-327d may be high enough above the equipment disposed thereon (such as double drum 322) such that multiple trolleys 216 may be stacked atop one another for shipment and/or storage. Holes located at each end of vertical posts 327a-327d may align with each other once stacked, allowing a support pin (not shown) to be inserted through aligned holes. Retaining clips (not shown) may be inserted though the support pin holding it in place.

Referring again to FIG. 9, each of the trolleys 216 atop each of the plurality of translation rails 212 may be controlled via separately bundled control wiring and power wiring (not shown) that may be coupled from a master control 340 to each control box 333 on each trolley 216. Power may be routed to the master control 340 and the control boxes 333 on the trolleys 216 via electrical distribution boxes 362 (as shown in FIG. 9). Each of the electrical distribution boxes 362 may dispense electrical power that may come from an electrical generator 363. For safety purposes, the electrical generator 363 may include a main power disconnection switch, a power "on" indicator light, emergency stop "ok" indicator light, quick disconnect couplings at the ends of the cables allowing uncoupling of cables without the use of tooling (not shown), wheels to move the electrical distribution boxes 362 without the use of cranes, and other safety equipment apparent to one of ordinary skill in the art.

Figure 17:
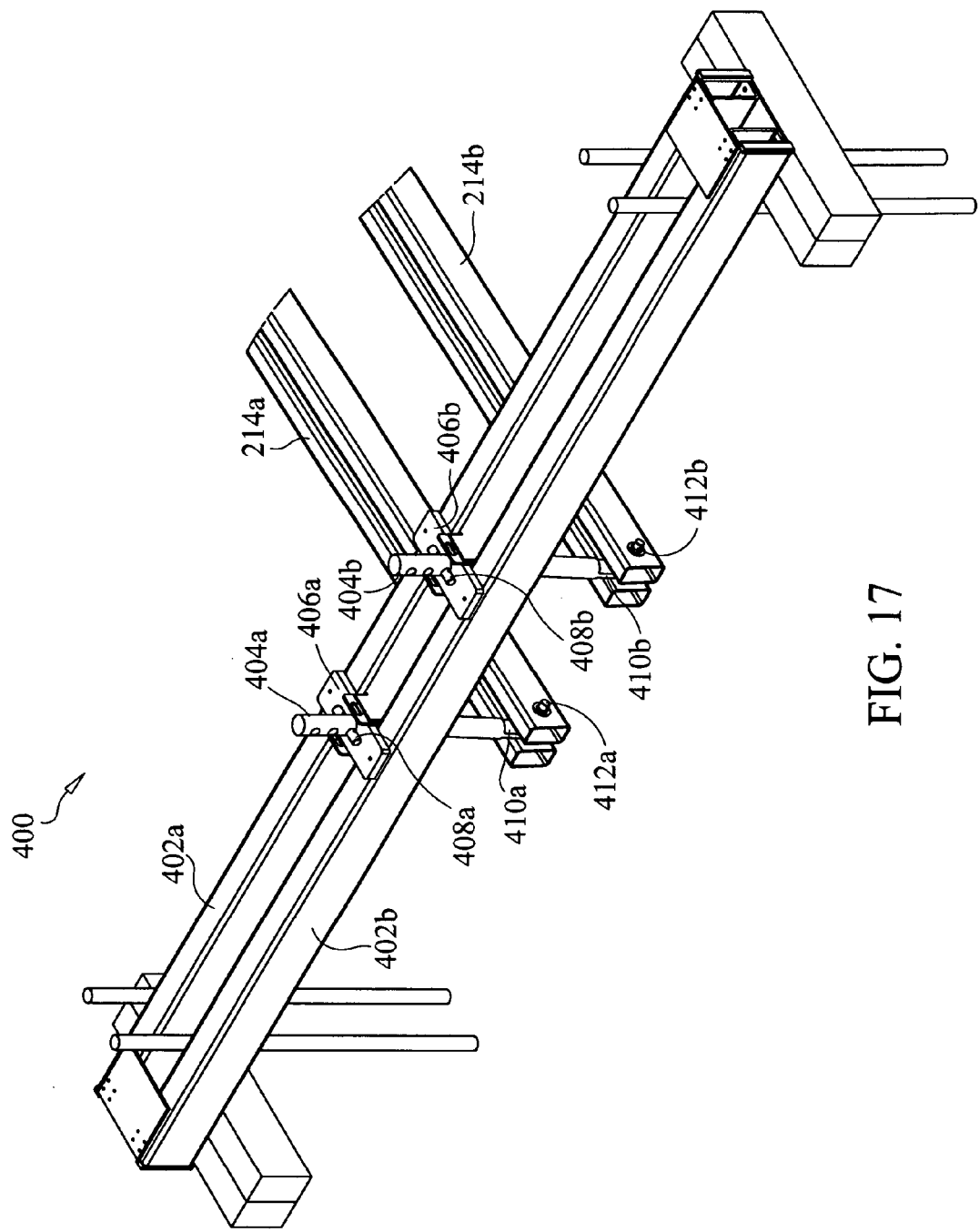
FIG. 17 illustrates a perspective view of a fixed end support in an embodiment of the present invention.

At terminal points (such as points $J_A$ and $J_B$, as illustrated in FIG. 9), may be a fixed end 400, illustrated in FIG. 17, that may consist of a pair of fixed end rails 402a, 402b that may be disposed across the trench T". The fixed end rails 402a, 402b may generally be coupled to conduit support beams 214a, 214b, but may be a terminating point for the conduit support beams 214a, 214b. Specifically, terminal rods 404a, 404b may be disposed through the fixed end rails 402a, 402b or otherwise disposed therebetween, and held to the fixed end rails 402a, 402b via plates 406a, 406b. Each of pins 408a, 408b may be disposed through terminal rods 404a, 404b within holes bored through terminal rods 404a, 404b, and shouldered against plates 406a, 406b, thus holding the terminal rods 404a, 404b in place. On a bottom end of the terminal rods 404a, 404b may be flat portions 410a, 410b that may fit within slots formed in the conduit support beams 214a, 214b, and held in place via pins 412a, 412b. The pins 412a, 412b may be held in place via retaining clips 414a, 414b. The holes disposed in the terminal rods 404a, 404b wherein pins 408a, 408b may be disposed therethrough may allow the terminal rods 404a, 404b to be raised and/or lowered, as necessary to generally keep the conduit support beams 214a, 214b generally aligned over the entire length of the conduit support beams 214a, 214b within the trench T". However, it should be noted that the pins 412a, 412b allow a degree of rotation to occur at the fixed end rails 402a, 402b, such that when the conduit support beams 214a, 214b are raised and/or lowered using the system described herein, the conduit support beams may pitch downwardly and/or upwardly as necessary, yet still be fixed to the terminal rods 404a, 404b, as described herein.

Figure 18:
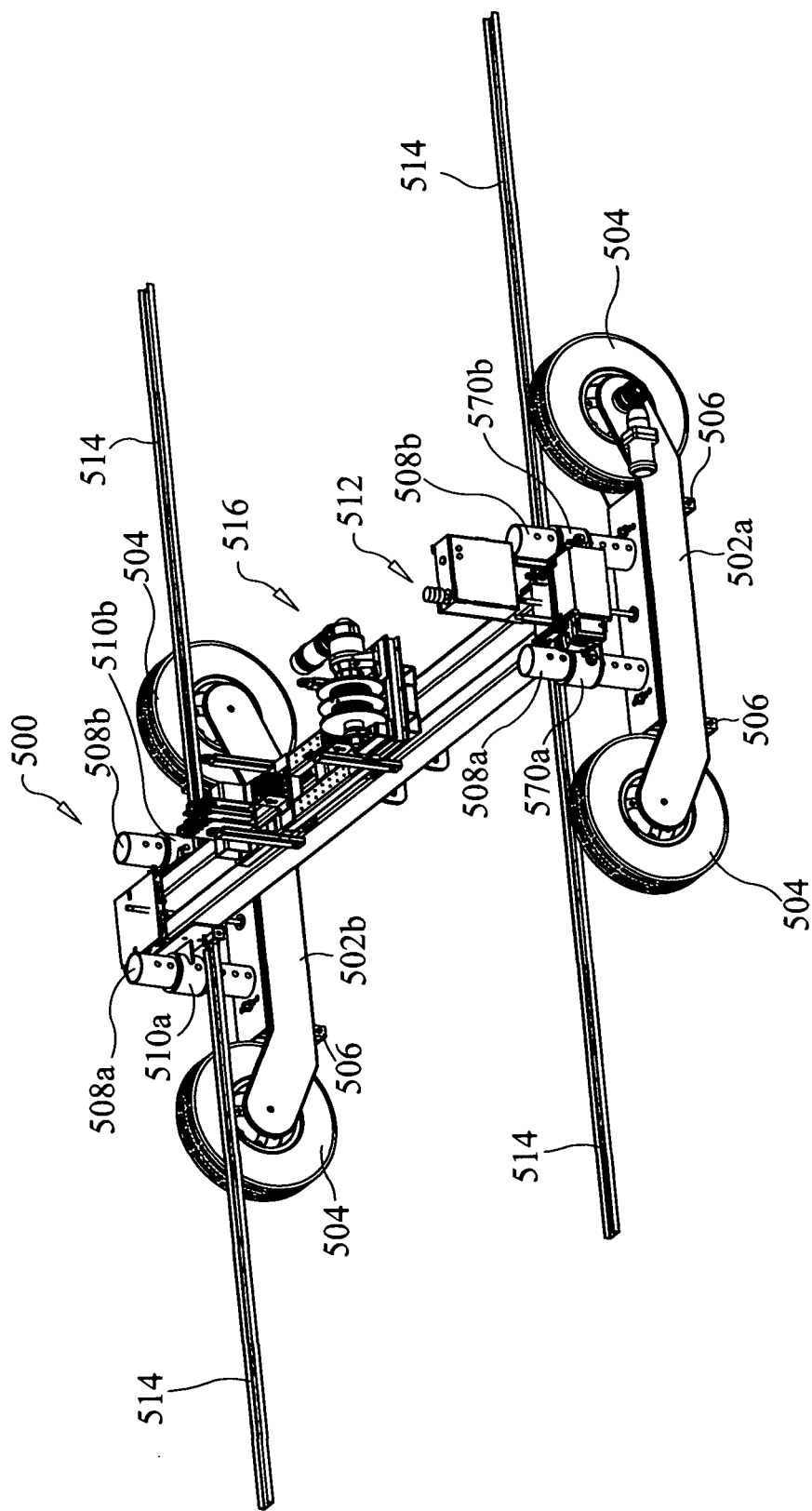
FIG. 18 illustrates a perspective view of a mobile lateral support and trolley assembly in an alternate embodiment of the present invention.
Figure 19:
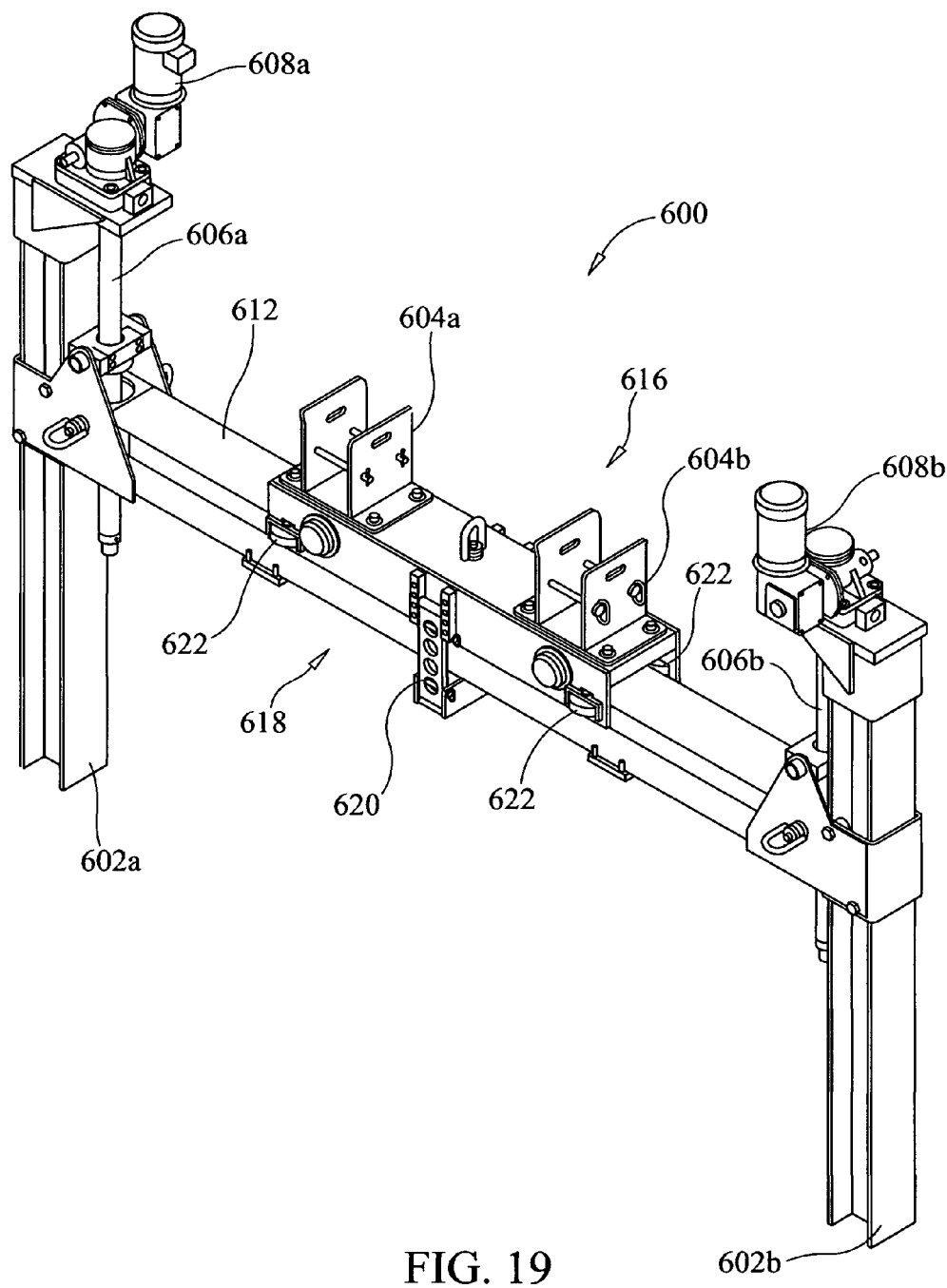
FIG. 19 illustrates a perspective view of a fixed lateral support and trolley assembly for large displacements in an alternate embodiment of the present invention.

An embodiment of the present invention provides the capability, once decoupled from the sheet pile, to collectively translate the entire conduit relocation systems, as described herein, longitudinally along the conduit, thereby moving the entire system longitudinally without complete removal of the conduit support beams from the trolleys. Specifically, FIG. 18 shows a perspective view of a mobile apparatus 500 of the present invention. The mobile apparatus 500 may include a pair of wheel carriages 502a, 502b to be disposed on opposite ends of translation rail 512. The translation rail may have a trolley 516 disposed thereon, the same or similar to trolleys 16 and 216, as described herein. The wheel carriages 502a, 502b may include a plurality of wheels 504 disposed thereon, allowing the entirety of the translation rail 512, trolley 516 and conduit support beams (not shown) that may or may not be coupled to the trolley 516, to be moved longitudinally along conduit (not shown) that may be disposed beneath the mobile apparatus 500. Thus, the mobile apparatus 500 may be moved to an alternate location, and set up to help move conduit disposed therebeneath.

Specifically, each of the wheel carriages 502a, 502b may have blocks 506 disposed beneath that may engage the ground when the wheel carriages 502a, 502b are moved into position. In addition, the wheel carriages 502a, 502b may each have vertical guide posts 508a, 508b, whereby the translation rail 512 may be disposed thereon via brackets 510a, 510b. Thus, the translation rail 512 may be disposed in one of many possible vertical positions along the vertical guide posts 508a, 508b. Specifically, a vertical drive may provide for the raising and/or lowering of each end of the translation rail 512 to new positions, thus allowing the translation rail 512 to maintain its horizontal and level position on uneven ground. Locking pins may be used to lock the ends of the translation rail 512 in position.

In addition, each of the wheeled carriages 502a, 502b may be connected to adjacent carriage assemblies, holding other translation rails, by means of tie rod channels 514. The tie rod channels 514 may have universal joints that allow the tie rod channels 514 to pivot at each end to allow flexibility during movement. The tie rod channels 514 may further carry carrier wire, electrical cabling and other like material from one carriage assembly to the next.

Properties of the Method and Apparatus for Relocating Conduit

Advantageously, a conduit relocation system and method in accordance with the present disclosure may hold conduit C, C' and/or C" in suspension with a force balance substantially identical to the force balance on conduit C, C' and/or C" when in service underground, thereby preserving the environment for which conduit C, C' and/or C" may have been originally designed. Further, the use of curved sheet pile during translation of conduit C, C' and/or C" may protect conduit C, C' and/or C" from impact or abrasion before, during and after translation.

The method of the present disclosure may allow the translation of conduit and, thus, cabling contained within conduit C, C' and/or C" in a relatively short amount of time. For example, telecommunications lines typically provide service continuously, but are typically taken out of service when movement of the cables becomes necessary. The signals carried by the cables, such as computer transmissions, cellular telephone transmissions, landline telephone transmissions, and other like transmissions, are typically routed to other cables in the area, which may place additional stress on the network receiving the additional data traffic. Because the systems and methods of the present disclosure facilitate fast conduit translation, this additional network stress may be minimized.

Moreover, in some cases, users of the rerouted cables may lose service while the cables are moved. Thus, the speed with which cables may be translated using the present systems and methods may enhance continuity of service provided by the cables contained within the relocated conduit. In addition, the cables contained within conduit C, C' and/or C" may not be taken out of service at all if sufficient slack exists at junction points $J_A$ and $J_B$ to allow translation of connected cables without placing stress on the cables. Where the amount of slack in the cables may be greater than zero but less than the amount of desired translation of conduit C, C' and/or C", each conduit section may be moved only enough to take up the available slack, and then the neighboring conduit sections can be moved. Further, movement of the original section can continue when the slack is again available, allowing movement of a conduit network with a small amount of cable slack without disconnecting the cables.

Also advantageously, original conduit material may be undisturbed by the present method. The structure integrity of the conduit may be preserved, and any hazardous materials which may be contained within the conduit material need never be exposed. Further, because the integrity of the conduit may be preserved, the conduit may be moved again at a later date while still preserving the functionality of the cable contained therein. Similarly, the cables of a relocated conduit installation may remain accessible in a similar manner as the cables of an original installation, rather than becoming inaccessible by being encased in concrete, for example.

Position Control Options

The positioning of the various moving parts of the above-identified invention may be precisely controlled via the Master Control Systems described herein. Specifically, the Master Control Systems may monitor and instruct the various motors to move precisely and with synchronization, thereby moving the entirety of the length of conduit precisely and with control. Monitors may be necessary to monitor the movement, positions, loads and/or other variables during a move of conduit pursuant to the present invention. Specifically, if a synchronized move between many apparatuses, including many motors, each controlling a different aspect of the move is required, the movements may be necessary within a specific tolerance. Any position deviation may distort the conduit duct package and cause cracking of the conduit. In addition, where a move requires both lateral translation of the conduit, as well as raising and/or lowering of the conduit, precise position feedback may be required. In a preferred embodiment, precise position feedback may be independent of movement of the various drive systems in order to eliminate inaccuracies.

Various methods may be utilized to monitor position and load feedback. For example, optical encoders, such as laser, LED, IR, or other like monitors may be utilized. Each optical encoder may be mounted on a translation rail, with a mirror target located on a trolley. Alternatively, an optical encoder may be mounted on a translation rail, with an optical receiver mounted on the trolley. Of course, the optical encoder may be mounted on the trolley, while the receiver may be mounted on the cross beam. Other examples of monitors may include cable encoders that may be mounted on the translation rail, limit switches may be placed in target locations (which may be particularly useful for providing safety mechanisms to apply brakes if moving parts trip the switches), capacitive feedback, such as photo eyes or other inductive measuring systems, magnetic encoders, such as hall effect scanners or magnetoresistive heads, or global positioning systems.

Load sensing may be implemented in the various embodiments to determine and monitor the weight of the load that is being moved. This may be accomplished using load cells and/or strain gauges. The load cells and/or strain gauges may be mounted beneath the trolleys so monitor whether the load may be over a predetermined limit. The load monitor may also send a safety signal to shut the system down if a weight limit has been reached.

Other Drive Options

The lateral movement of the conduit, such as via the trolleys, as described in various embodiments herein, as well as the raising and/or lowering of the conduit, may be implemented in various forms and drives. For example, as described herein, the lateral movement may be accomplished via a screw, or a fixed length actuator. Other options may include a linear motor, rack and pinion, a friction drive, a chain drive, a cable drive, or any other drive system that may allow for movement of the conduit laterally and/or up and down.

For example, in an embodiment of the present invention shown in FIG. 20, a perspective view of a large vertical displacement apparatus 600 is illustrated. The apparatus 600 may include vertical beams 602a, 602b that may be pile driven into the ground, thereby providing a high degree of stability, which may be useful when displacing a large amount of material. A translation rail 612 may be a steel I-beam, as shown in FIG. 20, and may have a trolley 616 disposed thereon. The trolley 616 may include cradles 604a, 604b for holding conduit support beams (not shown), as described above. Linear drives 606a, 606b, in the form of jack screws, may be fixed to the vertical beams 602a, 602b, driven by motors 608a, 608b. Thus, motors 608a, 608b may drive the linear drives 606a, 606b and move the entirety of translation rail 612 vertically, thus raising and/or lowering the conduit support beams disposed within the cradles 604a, 604b and the conduit or other item that may be disposed therebeneath.

In addition, the trolley 616, having conduit support beams disposed within cradles 604a, 604b, may translate laterally along translation rail via a linear drive 618 that may be disposed beneath the translation rail 612. A plurality of strategically placed rollers 622 may be disposed on or within the trolley 616 to allow smooth lateral movement of the trolley 616 across translation rail 612. An armature 620 may be utilized to connect the trolley 616 to the linear drive 618 disposed beneath the translation rail 612, thereby providing lateral movement to the trolley 616 via movement of the linear drive 618. Thus, conduit disposed therebeneath, or any material or item needing movement may be moved using one or more large vertical displacement apparatuses 600 positioned adjacently, as described above.

Control Software

The Master Control Systems of the present invention should include software, and be controlled using computing devices that may have the ability to control a large number of motors and drives, driving multiple axes on a plurality of apparatuses, as described herein. Specifically, the software utilized to control the various systems may preferably coordinate multiple axis, coordinate the horizontal, vertical, lateral and/or longitudinal moves of multiple units, handle multiple drive systems and multiple drive types, handle multiple feedback and monitoring systems and types, handle emergency stop input signals, and handle and coordinate redundant feedbacks, such as GPS and optical encoders.

Moreover, the software of the present invention may be utilized to provide virtual mapping of the systems necessary to handle the movement of conduit, as described above. Thus, materials and resources may be precisely calculated for each movement of conduit. Specifically, software of the present invention may require input on variables such as conduit properties and/or characteristics, as well as ground type, amount of movement necessary, length and type of conduit, and other like variables. Software may output the amount of materials and resources necessary to complete the move of the conduit, such as the number of translation rails, the load capacity needed, trench materials necessary, filling materials necessary, the length of the system, and other like requirements. Thus, precise planning of a move may be implemented prior to conducting the move, saving time, materials and money.

It should be noted that various changes and modifications to the presently preferred embodiments described herein will be apparent to those skilled in the art. Such changes and modifications may be made without departing from the spirit and scope of the present invention and without diminishing its attendant advantages.

We claim:

1. A conduit transport system for transferring an elongated section of an excavated subterranean conduit the system comprising:
    a first lateral support sized to extend over the subterranean conduit at a first location of the elongated section and further sized to extend over a first position at the first location of the elongated section and a second position displaced laterally or vertically from the first position;
    a first trolley assembly adapted to translate along the first lateral support;

a first longitudinal conduit support coupled to the first trolley assembly;

a first drive coupled to the first trolley assembly, said first drive operable to move the first longitudinal conduit support from the first position at the first location to the second position displaced laterally or vertically from the first position;

a second lateral support sized to extend over the subterranean conduit at a second location of the elongated section and further sized to extend over a first position at the second location of the elongated section and a second position displaced laterally or vertically from the first position and the second location;

a second trolley assembly adapted to translate along the second lateral support;

a second longitudinal conduit support coupled to the second trolley assembly;

a second drive coupled to the second trolley assembly, said second drive operable to move the second longitudinal conduit support from the first position at the second location to the second position displaced laterally or vertically from the first position at the second location; and a control system engaged to the first drive of the first trolley and the second drive of the second trolley for coordinating the movement of the first and second longitudinal conduit supports for coordinated movement of the elongated section of the excavated conduit.

2. The conduit transport system of claim 1 wherein the first drive is operable to translate the first trolley assembly along the first lateral support and further wherein translating the first trolley assembly concurrently moves the first longitudinal conduit support.

3. The conduit transport system of claim 1 wherein the first drive is operable to vertically move the first longitudinal conduit support.

4. The conduit transport system of claim 1 further comprising:

a second drive coupled to the first trolley assembly, wherein the first drive is operable to translate the first trolley assembly along the first lateral support and further wherein translating the first trolley assembly concurrently moves the first longitudinal conduit support, and further wherein the second drive coupled to the first trolley assembly is operable to vertically move the first longitudinal conduit support.

5. The conduit transport system of claim 4 further comprising:

a control system engaged with the first drive of the first trolley and the second drive of the first trolley to control the first drive of the first trolley and the second drive of the second trolley for controlling both lateral and vertical movement of the longitudinal conduit support.

6. The conduit transport system of claim 1 further comprising:

a first holding element disposed beneath and coupled to the first longitudinal conduit support, wherein the first holding element is operable to hold the conduit.

7. The conduit transport system of claim 6 wherein the first holding element is a curved sheet.

8. The conduit transport system of claim 1 further comprising:

a second longitudinal conduit support disposed adjacent the first longitudinal conduit support and coupled to the first trolley assembly.

9. The conduit transport system of claim 8 further comprising:

a first holding element disposed beneath and coupled to the first longitudinal conduit support and the second longitudinal conduit support, wherein the first holding element is operable to hold the conduit.

10. The conduit transport system of claim 9 wherein first the holding element is a curved sheet.

11. The conduit transport system of claim 1 further comprising:

a length of conduit disposed beneath the first lateral support, wherein the length of conduit is operatively coupled to the first longitudinal conduit support, wherein movement of the first longitudinal conduit support operates to move the conduit.

12. The conduit transport system of claim 11 further comprising:

a trench having a first side and a second side and an excavated area between the first side and the second side, wherein the conduit is disposed at the first position at the first location within the trench, and further wherein movement of the first longitudinal conduit support operates to move the conduit from the first position to the second position within the trench.

13. The conduit transport system of claim 12 wherein the first lateral support extends from the first side of the trench to the second side of the trench.

14. A method of moving subterranean conduit from a first location to a second location, the method comprising:

providing buried subterranean conduit;

excavating an area around the conduit to form a trench having a first side and a second side, and an excavated area for moving the conduit from a first location to a second location within the excavated area of the trench;

placing a plurality of lateral supports across the excavated area from a first side of the trench to the second side of the trench, each of the lateral supports having a trolley assembly disposed thereon, wherein the trolley assemblies move laterally along the lateral supports;

connecting at least one longitudinal support to each of the plurality of trolley assemblies so that each of the longitudinal supports is positioned over the conduit;

placing a conduit support beneath the conduit and each of the longitudinal supports for supporting the conduit;

coupling each of the conduit supports to respective longitudinal supports so that the conduit is supported by each of the conduit supports;

providing a control system for coordinating the simultaneous movement of each of the longitudinal supports; and simultaneously moving each of the longitudinal supports with the control system to move the conduit from the first location to the second location.

15. The method of claim 14 further comprising:

providing a plurality of drives, each of the plurality of drives coupled to one of the plurality trolley assemblies; and controlling the plurality of drives with the control system to move the conduit from the first location to the second location.

16. The method of claim 15 further comprising:

controlling the plurality of drives with the control system to move the conduit laterally from the first location to the second location within the trench.

17. The method of claim 15 further comprising:
controlling the plurality of drives with the control system to move the conduit vertically from the first location to the second location within the trench.

18. The method of claim 15 further comprising:
providing a first plurality of drives, each of the first plurality of drives coupled to each of the plurality of trolley assemblies, wherein the first plurality of drives controls the lateral movement of the trolley assemblies along the plurality of lateral supports;
providing a second plurality of drives, each of the second plurality of drives coupled to each of the plurality of trolley assemblies, wherein the second plurality of drives controls the vertical movement of the longitudinal support; and
moving the conduit with at least one of the first plurality of drives and the second plurality of drives.

19. The method of claim 18 further comprising:
moving the conduit with both the first plurality of drives and the second plurality of drives.

20. The method of claim 18 further comprising:
moving the conduit laterally from the first location to the second location with the first plurality of drives.

21. The method of claim 18 further comprising:
moving the conduit vertically from the first location to the second location with the second plurality of drives.

22. The method of claim 18 further comprising:
moving the conduit both vertically and laterally from the first location to the second location using both the first plurality of drives and the second plurality of drives.

23. The method of claim 18
wherein the control system controls the movement of the first plurality of drives and the second plurality of drives; and
controlling at least one of the first plurality of drives and the second plurality of drives with the control system to move the conduit from the first location to the second location.

24. The method of claim 23 further comprising:
synchronizing the movement of the at least one of the first plurality of the drives and the second plurality of drives with the control system to move the conduit from the first location to the second location.

\* \* \* \* \*